United States Patent [19]
Cameron et al.

[11] Patent Number: 5,737,726
[45] Date of Patent: Apr. 7, 1998

[54] CUSTOMER CONTACT MANGEMENT SYSTEM

[75] Inventors: Paul Scott Cameron, Minneapolis; John Charles Nash, Shoreview; Robert Christopher Bloomer, Little Canada; Robert Edward Wollan, St. Paul; Melinda Ann Ahler Olmstead, Shoreview; Kelly Marie Kreutter, Minnetonka, all of Minn.

[73] Assignee: Anderson Consulting LLP, Chicago, Ill.

[21] Appl. No.: 570,753

[22] Filed: Dec. 12, 1995

[51] Int. Cl.$^6$ ............................................. G06F 17/60
[52] U.S. Cl. ............................ 705/7; 395/601; 395/615
[58] Field of Search ................................ 705/7, 10, 26; 395/615, 601; 379/93.12

[56] References Cited

U.S. PATENT DOCUMENTS

| | | | |
|---|---|---|---|
| 4,853,852 | 8/1989 | Rosen | 705/10 |
| 5,097,528 | 3/1992 | Gursahaney et al. | 379/67 |
| 5,402,474 | 3/1995 | Miller et al. | 379/93.12 |
| 5,555,403 | 9/1996 | Cambot et al. | 395/600 |
| 5,628,004 | 5/1997 | Gormley et al. | 395/615 |
| 5,666,493 | 9/1997 | Wojcik et al. | 705/26 |

OTHER PUBLICATIONS

Nichol, Fran, Effective Software Is A Crucial Element In Managing a Real Estate Business, National Real Estate Investor, pp. 65, 68, 70, 72, 74, Jan. 1992.

Stahl, Stephanie, Veritas Expands on Notes, Information-Week, p. 76, Jul. 10, 1995.

Hipszer, Tony, Cantact Management, Systems Management 3X/400, pp. 98–99 (abstract only), Feb. 1994.

Hatlestad, Luc, Onyx Customer Center focuses on quality assurance, InfoWorld, p. 29, Jun. 12, 1995.

Help desk tools can also serve customers, Network World, p. 36, Feb. 20, 1995.

Lawler, Edmond O., Getting More Bang for the Buck, Avertising Age's Business Marketing, formerly Business Marketing, pp. 30–31, Dec. 1993.

French, Bob, Reaping the benefits of automated marketing, American Agent and Broker, pp. 51–54, Jun. 1993.

Cahill, Dennis, Goldmine Version, Journal of Services Marketing, pp. 65–67, 1993.

Berman, Helen, Your Electronic Ad Sales Ally, Folio: The Magazine for Magazine Management, pp. 60, 62, Dec. 1992.

*Primary Examiner*—Gail O. Hayes
*Assistant Examiner*—Barton L. Bainbridge
*Attorney, Agent, or Firm*—Merchant, Gould, Smith, Edell, Welter & Schmidt P.A.

[57] ABSTRACT

A customer contact management system is described. The system can be customized in order to provide custom contact types and sub-types for the types of contacts relating to individual customers, groups of customers, and business entities. User preferences may be defined to further customize the system to provide the most convenient and time efficient searching, entry, and response actions. Prior contacts can be searched and located by generating filter criteria through the order-independent selection of contact types, contact sub-types, customer identification, and customer contact dates. Records detailing the nature of the customer contact can be stored, whether the contact is user-initiated, system-initiated, or customer-initiated. Internal messages and scripted messages are provided to assist the user of the system in conducting customer service activities. The number and frequency of the internal and scripted messages can be altered according to the experience level of the user.

85 Claims, 17 Drawing Sheets

DEFINE CUSTOM FRAMEWORK STEP

SEARCH FOR BUSINESS EVENTS STEP    FIG. 17A
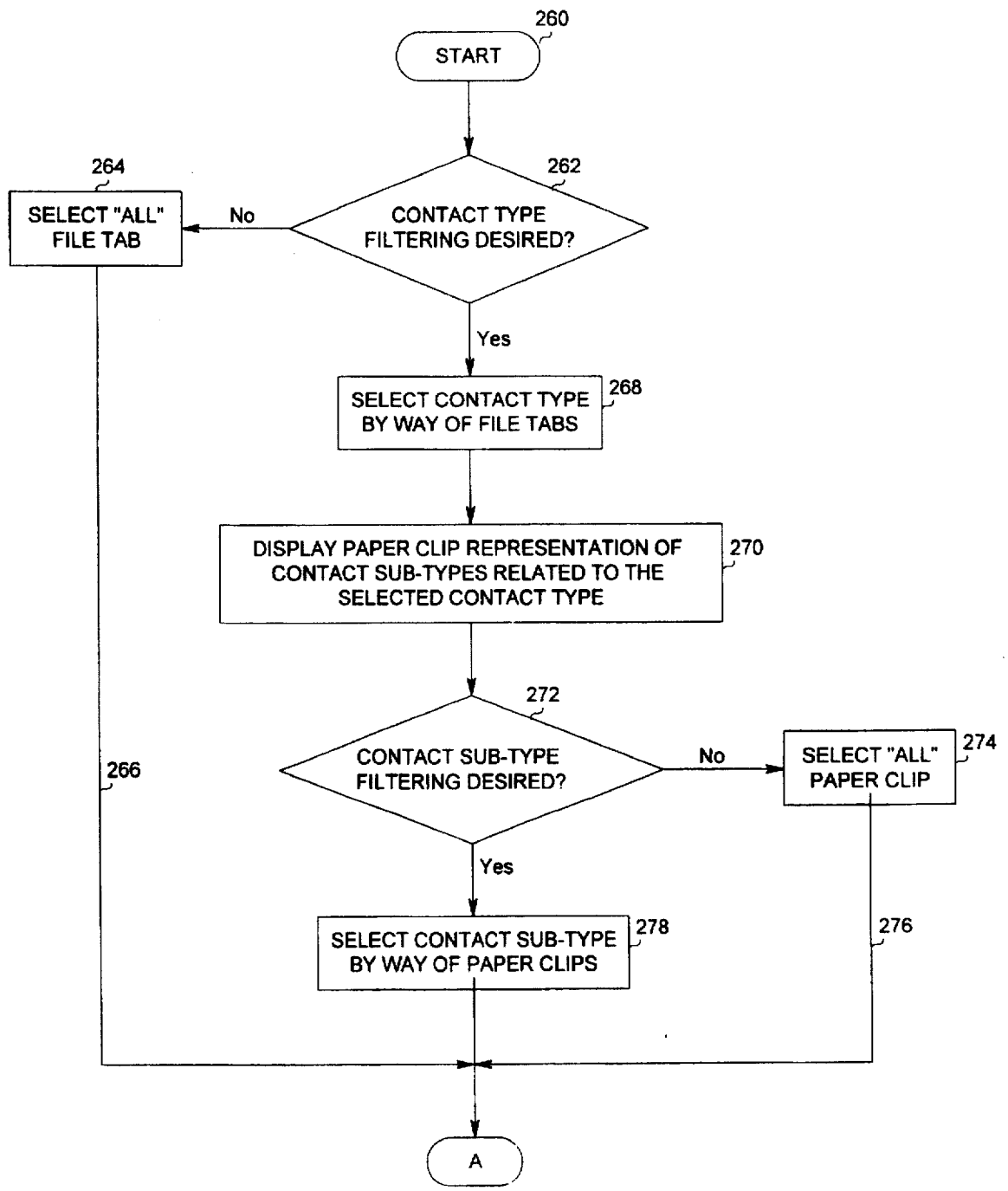

CUSTOMER CONTACT MANGEMENT SYSTEM

FIELD OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The present invention relates to a computerized customer service system and method, and more particularly to a customizable computerized customer service system that is used to store, retrieve, and display customer contact information.

BACKGROUND OF THE INVENTION

Product vendors and service providers are often looking for new ways to provide better customer service to their customers. To maintain good customer relations, it is important for vendors and service providers to allow customers to maintain contact with them to ensure customer satisfaction. These contacts may include customer's questions regarding the product or service, shipment or delivery status, inquiries about defective products, or any other customer concern. Product vendors and service providers often provide their customers with access to customer service personnel so that the customers may make inquiries or voice their complaints.

It may also be important for vendors and service providers to have the ability to initiate communications with their customers. It is often desirable to provide a record of the business communication provided to their customers, such as customer surveys and advertisement mailings.

Providing customer service, whether to respond to customer inquiries and complaints or to initiate communications with customers, involves a cost of doing business to the vendor or service provider. The ideal goal of a business would be to provide the optimal amount of customer service at the lowest possible cost. Customer service costs increase as the time required for each customer contact increases. This is a result of many factors, including the need for additional customer service representatives to manage the demand for customer service. It is therefore desirable to minimize the time in which a customer service representative spends with each customer, without compromising the quality of service rendered.

The time required for a customer service representative to sufficiently respond to a customer inquiry depends on a variety of factors. One problem is that different customers or groups of customers may make different types of inquiries, or contacts, with the product vendor or service provider than what other customers or groups of customers may make. This makes locating a previous customer contact more difficult, since it may require searching through a large number of categories of contacts, some of which are unrelated to any type of contact that the customer would make. This problem is even more evident where the customer service representative provides service to more than one company or business having a combined customer base. Each company may have different categories of customer contacts, many of which are completely unrelated to a particular customer. Searching through these different categories for the correct one increases the time in which a customer service representative must spend with each customer.

In order to alleviate these problems, many customer service representatives use the customer's name, customer number, or other customer identifier to locate all contacts made by that customer. The customer service representative must therefore get the correct spelling of the name (or a portion thereof) of the customer, which allows the customer service representative to locate that customer's file. The customer service representative must then search through all of the files to locate the customer contact in which the customer is making an inquiry. This can be very time-consuming, even if performed on a computer. Where a customer has a large number of contacts, as a corporate customer may have, the customer service representative is required to search through the documents, whether hardcopy or electronic, to locate the correct business event.

Customer service representatives have also used order numbers to attempt to quickly narrow their search. This method may work well for orders in which a number is associated with the search, but does not work well for other inquiries not associated with a number. Furthermore, this requires the customer to know the order number, which in reality does not always (or often) hold true.

Another problem which can increase the time and money involved in providing customer service is the fact that new customer service representatives are not experienced, and they require assistance in providing service to customers. This may require another customer service representative to sit with the new representative in order to teach him or her what to say and how search for prior customer contacts. It would therefore be desirable to have a system which is very user-friendly, and prompts the customer representative to perform certain duties or to respond in the proper way at the proper time.

A related problem is that there is a wide variance in experience levels among customer service representatives. Those with less experience require a greater amount of assistance in providing service to the customer. While it may be desirable to provide assistance to those with little experience, this assistance must not be effected such that it causes response delays for those customer service representatives who need little or no assistance. Therefore, it would be advantageous for a customer service system to provide various levels of assistance to customer service representatives according to their respective degrees of experience.

The present invention addresses these problems by providing a customizable, user-friendly, customer contact management system. The system allows the customer service representative to more quickly locate prior customer contacts, thereby reducing the time required with each customer. This may be accomplished by providing a customizable system in which custom contact types may be generated according to the characteristics of an individual customer, group of customers, or business entity having a customer base. Therefore, only those contact types related to the customer, group of customers, or business entity are displayed to the customer service representative. This allows searching by relevant categories, rather than searching through categories unrelated to the customer. Contact types may also be defined to include contact sub-types, which further decreases search time.

The present invention is designed to avoid the problems associated with customers failing to have all of the relevant information regarding a prior contact at their fingertips. Traditionally, a customer service representative asks the customer a series of questions regarding the prior contact, and the customer is expected to reply. The present invention, on the other hand, is designed to allow the customer to determine the flow of the contact. Unlike traditional systems that require specific information (e.g., customer number, order number, etc.) for the customer service representative to begin the process, customer service representatives using the present invention can capture information as it is provided by the customer. Therefore, the customer can simply start providing information, including customer identification information, contact date, contact type, order number, and other information to the customer service representative. The customer service representative can then use this information, regardless of the order provided to him/her, to locate the desired information. Automatic Number identification (ANI) is used to quickly identify a customer record based on the telephone number from which the customer is calling. Dialed Number Identification (DNI) is also used to identify a company/area that a customer has called based on the telephone number that the customer dialed. All of these features provide accurate identification of the customer and prior contacts in a short period of time.

The present invention also helps reduce the customer service period by providing a very user-friendly and adaptable system. First, the system utilizes displays which are recognizable even by an inexperienced customer service representative. The system displays a file folder having file tabs corresponding to the contact types, and paper clips are displayed which bind electronically stored records related to the customer. Calendars and depictions of notebooks are used to list the contacts a customer has previously made. These displays are therefore designed to correlate to hardcopy filing systems, which reduces the training time for customer service representatives.

The system also allows a customer service representative to modify the display to his or her own preferences. For instance, a customer service representative can change the order of the file tabs on the displayed file folder to whatever order is most convenient for him or her. The user-friendly nature of the present invention is further seen by its system-prompted scripted messaging. With the high turnover of personnel, as well as seasonal personnel needs, scripted messaging provides a method for consistent messages to be presented by the customer service representative to the customer, regardless of the experience level of the service representative. Furthermore, the system allows customer service representatives to indicate their experience level, so that scripted messages are only provided to users who need the assistance. This not only helps the inexperienced customer service representative by providing the proper responses at the proper time, but also prevents experienced users who do not need the assistance from being slowed down by unnecessary assistance.

The present invention therefore solves many problems of traditional customer service systems, by providing a user-friendly, customizable system which in turn provides consistent service, accurate information, reduced training time, and reduced customer service contact durations.

SUMMARY OF THE INVENTION

A novel customer contact management system is disclosed. The present invention is a computerized customer service system which is used to assist a customer service representative in providing service to a customer in connection with products, information and services. The customer service system includes a computer system which can store, display, and process information. Computer program code running on the computer directs the computer to perform the desired customer service functions. The program code is capable of storing customer relationship information, which includes customer identification information, and business events related to a customer. The software provides a framework which can be customized so as to provide a custom framework according to the types of contacts relating to individual customers, groups of customers, companies having a certain customer base, or according to the preferences of the customer service representative. Within each custom framework, the customer relationship information can be stored, retrieved, and displayed. The framework is preferably customized according to the contact types related to the customer, group of customers, or company. The customer service system can display these contact types within the customizable framework associated with the respective customer, group of customers, or company. The system also allows any previously stored business events to be searched within a custom framework by locating specific customer identification information, business events falling on a particular date, or business events which are of a certain one or more contact types. When a particular business event is located by a customer service representative, an associated record of that business event can be displayed which details the nature of the business event.

Still other objects and advantages of the present invention will become readily apparent to those skilled in this art from the following detailed description, where the preferred embodiment of the invention is shown by way of illustration of the best mode contemplated of carrying out the invention.

DETAILED DESCRIPTION OF THE PREFERRED EMBODIMENTS

In the following detailed description of the preferred embodiments, reference is made to the accompanying drawings which form a part hereof and in which is shown by way of illustration of a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense and the scope of the present invention is defined by the appended claims.

Figure 1:
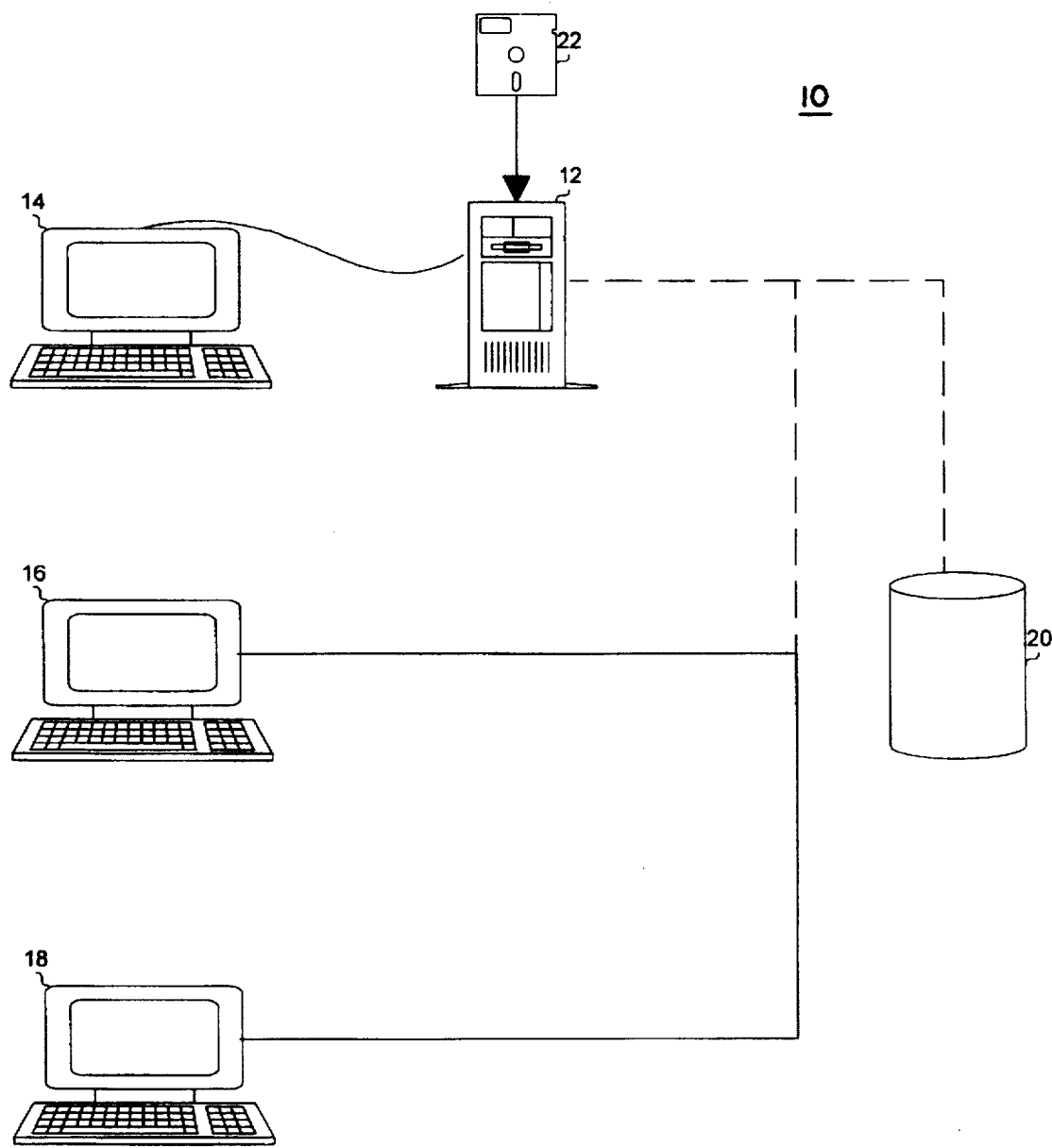
FIG. 1 illustrates a customer contact management system environment.

FIG. 1 illustrates a customer contact management system 10 environment. Computing device 12 can be a stand alone computer, or a file server connected to other terminals in the system. Terminal 14 is coupled to the computing device 12 for providing a visual display. Where the computing device 12 is in a multi-terminal system, terminals 16 and 18 can be coupled to the computing device 12 for providing user interfaces for multiple users. Database storage 20 can also be coupled to the computing device 12 to provide additional storage from that of the computing device 12. Program 22, which represents a computer program, or program code on a computer-readable memory, directs the actions of the computing device 12 to perform the desired functions of the invention.

Terminals 14, 16 and 18, along with their corresponding computing device(s) 12, can be any type of data entry device, such as computers, multimedia kiosks or interactive television. In addition, where the computing device 12 is part of a network having one or more file servers, the number of computing devices 12 acting as servers is not critical. However, in order to improve performance, customer contact management system 10 preferably distributes data over multiple servers so as to minimize the contention on any single server. The architecture of the preferred system also supports high performance and high scalability by using database segmentation, data location transparency, and multi-threading strategies. Such an architecture may be critical for rapidly expanding businesses with high seasonal peaks.

The preferred customer contact management system 10 uses traditional programming language with fourth generation language tools, both using object based mechanisms. Unlike process-driven languages, this type of language operates in an event-driven mode. The object based event driven nature of the application allows the system to map logic against the business rules that are processed when the user initiates an event (e.g. "clicking" on a selector button, exiting a specific data entry field, etc.).

In addition, system 10 preferably uses a graphical user interface (GUI) which provides an efficient interaction between the user and the system. GUI allows system 10 to react to each user input instead of having to wait for an entire screen to be filled. This allows the application to execute fewer instructions per interaction, and thereby respond to the user more quickly. This level of responsiveness both reduces errors and enhances user satisfaction. It also provides a customer driven flow whereby the flow is driven by customer requests, rather than system constraints.

Customer contact management system 10 is preferably an object-oriented system. With object-oriented systems, functions performed by the system are each represented by an object. An object is a software packet containing a collection of related data and methods for operating on that data. Each method is made available to other objects for the purpose of requesting services of that object. Each object includes a set of related sub-functions. Accordingly, each object is preferably arranged as a structured collection of sub-functions, while each function should be arranged as a structured collection of objects.

Inheritance is a feature of object-oriented systems through which a new object can absorb the properties of an existing object. As a result, new objects (e.g., functions) may be added with minimal changes to existing objects, thereby significantly reducing development time and maintaining a consistent user interface to the user. Maintenance of the system is also easier through the use of inheritance. Inheritance also allows the use of common objects across applications. As a result, a system that is capable of evolving over time to meet changing needs can be achieved.

Figure 2:
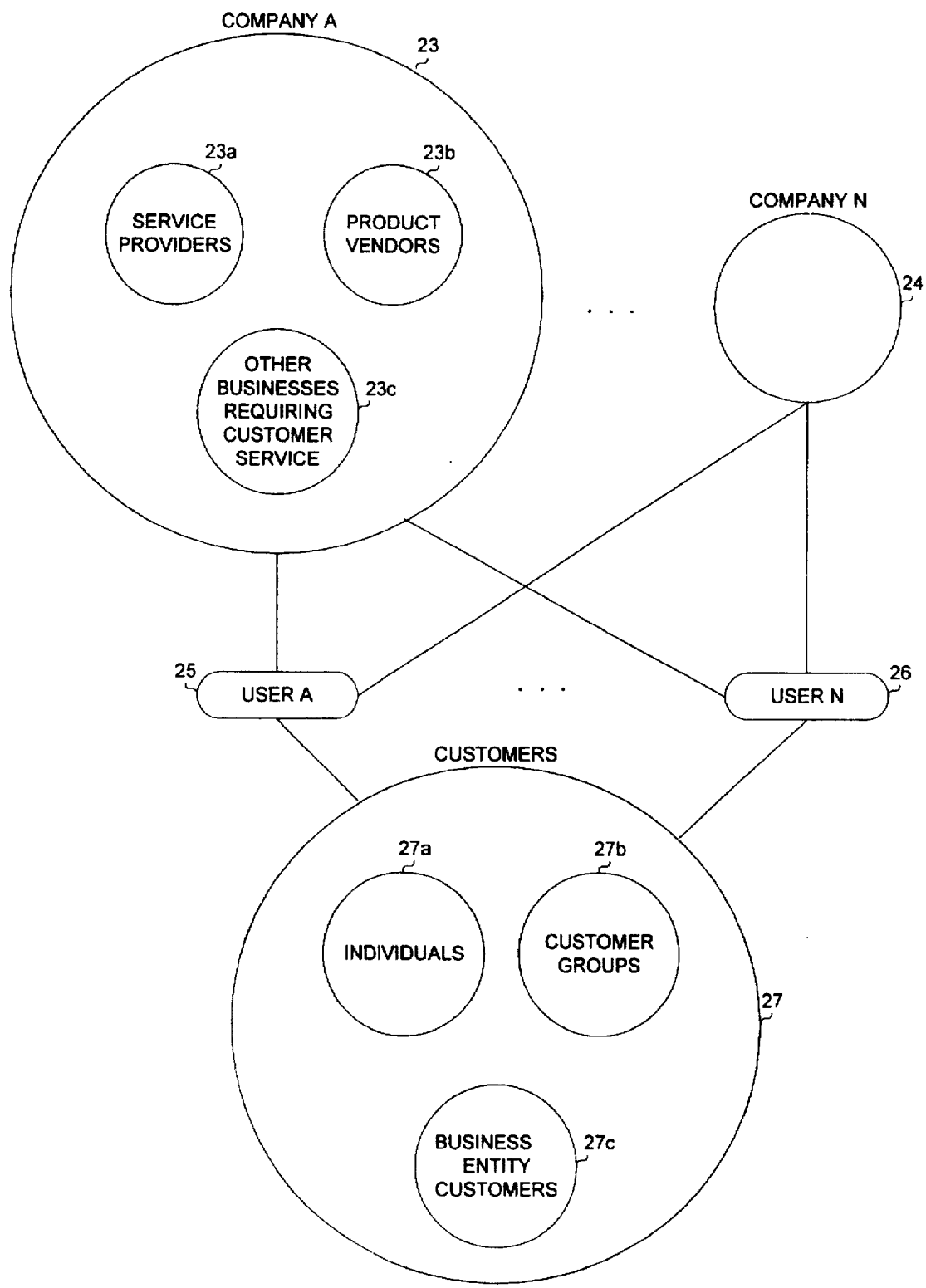
FIG. 2 illustrates the relationship between the companies providing customer service, the users of a customer contact management system, and the companies' customers.

FIG. 2 illustrates the relationship between the companies providing customer service, the users of the system 10, and the companies customers. Multiple companies may utilize system 10 as represented by company A 23 through company n 24. A "company" may include service providers 23a, product vendors 23b, or other businesses requiring customer service 23c. These companies or businesses have one or more users, shown as user A 25 through user n 26, who are the actual contact points for the customers 27. The user is often an agent of the company, however sophisticated customers may also be the "users" of the system 10 in situations where the company allows those customers to directly access business events and records stored in the system 10. The customers are those persons or entities that are the customers of companies A 23 through n 24. The customers may include individuals 27a, customer groups 27b, and business entity customers 27c.

Figure 3:
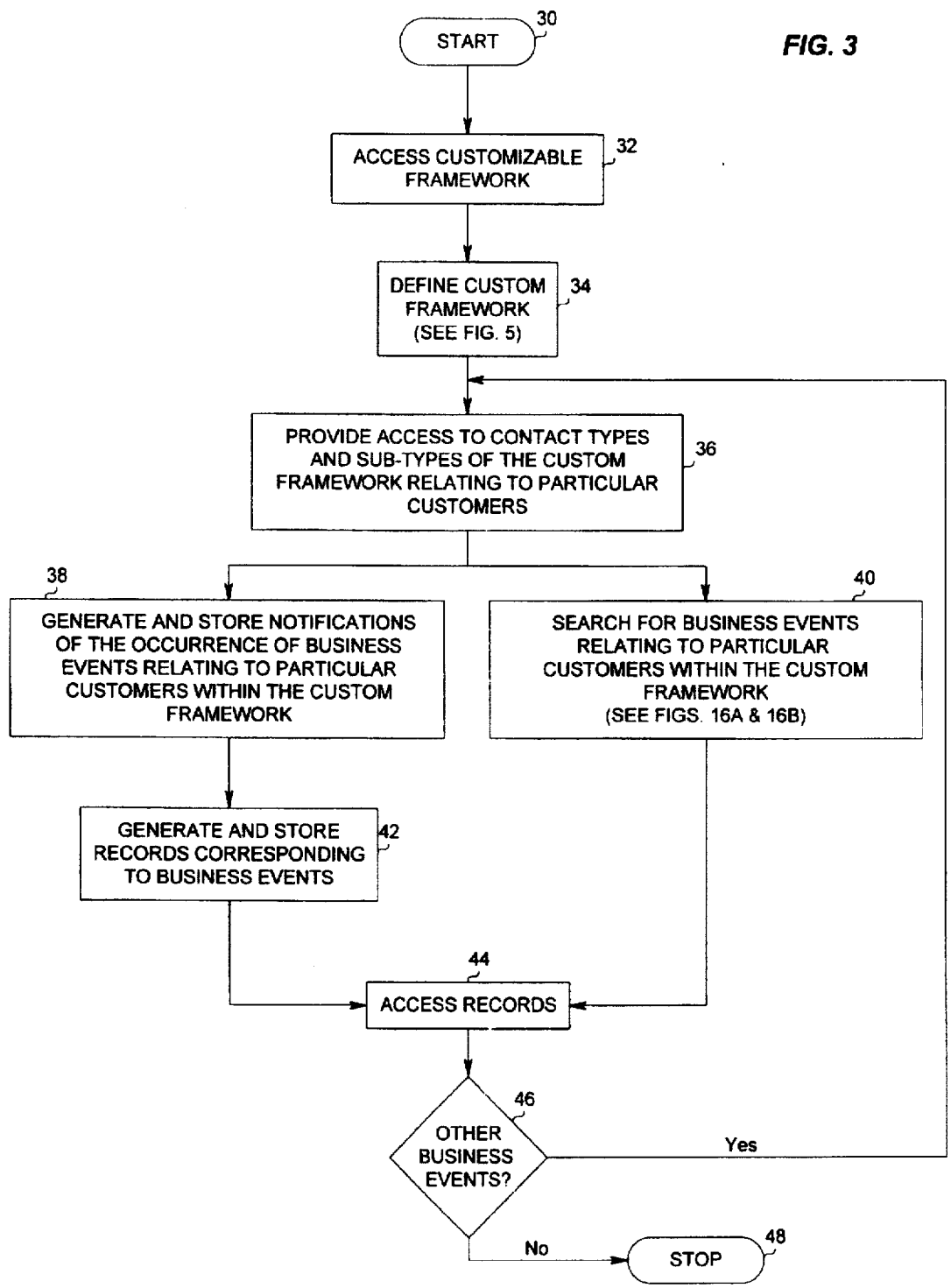
FIG. 3 illustrates the basic flow of the program code directing the computer to perform the functions of a preferred embodiment of the invention.

FIG. 3 illustrates the basic operation of program 22, beginning at start step 30. Step 32 provides a customizable customer service framework, which is described in more detail in relation to FIG. 4. The customizable framework can be modified to correspond to customer service contacts or types of customer service contacts with a particular customer or group of customers. A customer service contact, more generally referred to as a "contact", is a communication between a customer and the user of the customer contact management system 10. The user of the customer contact management system 10 is typically an agent of the product/service provider. The contact can be initiated by either the customer or the user by way of any communication mechanism whereby information, products or services are exchanged. "Contact types" are categories of contacts. This categorization is completely definable, so that a category may be defined as contacts using a specific communication mechanism, or inbound contacts, outbound contacts, etc. In fact, a contact type can represent each individual contact if desired, so that certain contact types do not represent "groupings" of contacts at all, but rather represent individual contacts. A "contact" is a generic term for a communication between a customer and the user, and a "business event" is a specific instance of a contact between a customer and the user at a specific date and time. In other words, a business event is defined to be a specific one of the contacts. An example of a business event would be a fax sent to the user by the customer for an order on Jan. 1, 1994 at 9:00 a.m. This specificity distinguishes a "business event" from the more generic term "contacts", which refers to business events in general.

It should be noted that the contact types could be defined to represent actual business events as well as contacts or contact groupings. In other words, using the previous example, a contact type could be defined as narrowly as the contact type representing a fax sent to the user by a specific customer for an order on Jan. 1, 1994 at 9:00 a.m. However, the contact types could also be defined broadly, as in a contact type representing customer orders. Accordingly, the contact types which are ultimately used to define the customizable framework may be defined in any fashion desired by the company utilizing the customer contact management system 10, which makes for a very flexible and user-friendly customer service tool.

Again referring to FIG. 3, the customizable framework can be specifically modified according to contacts or contact types relating to a particular customer or group of customers. This modification results in the definition of a custom framework shown at step 34. This step involves the inclusion or exclusion of particular categories of user-customer relations and contacts, i.e. the inclusion or exclusion of contact types, defined as broadly or narrowly as desired. Once the custom framework has been defined, step 36 provides access to the user-customer relations and contacts defined by the custom framework relating to that customer or group of customers. The user-customer relations, i.e., notifications of the occurrence of contacts, can be generated by the user in step 38. Furthermore, step 40 shows that previously generated or stored contacts can be located by searching the database for those contacts relating to the customer or group of customers. When a notification of a contact is generated in step 38, a record or document associated with that contact is generated at step 42 to provide a record of the substance of that user-customer contact. Similarly, contacts initiated by a customer can be stored as a record in the system. Finally, any of the generated, stored, or located contacts which have associated records can be accessed at any time by the user, as shown in step 44. Step 46 shows that additional contacts can be searched or stored by returning to step 36. Otherwise, the process ends at step 48.

Figure 4:
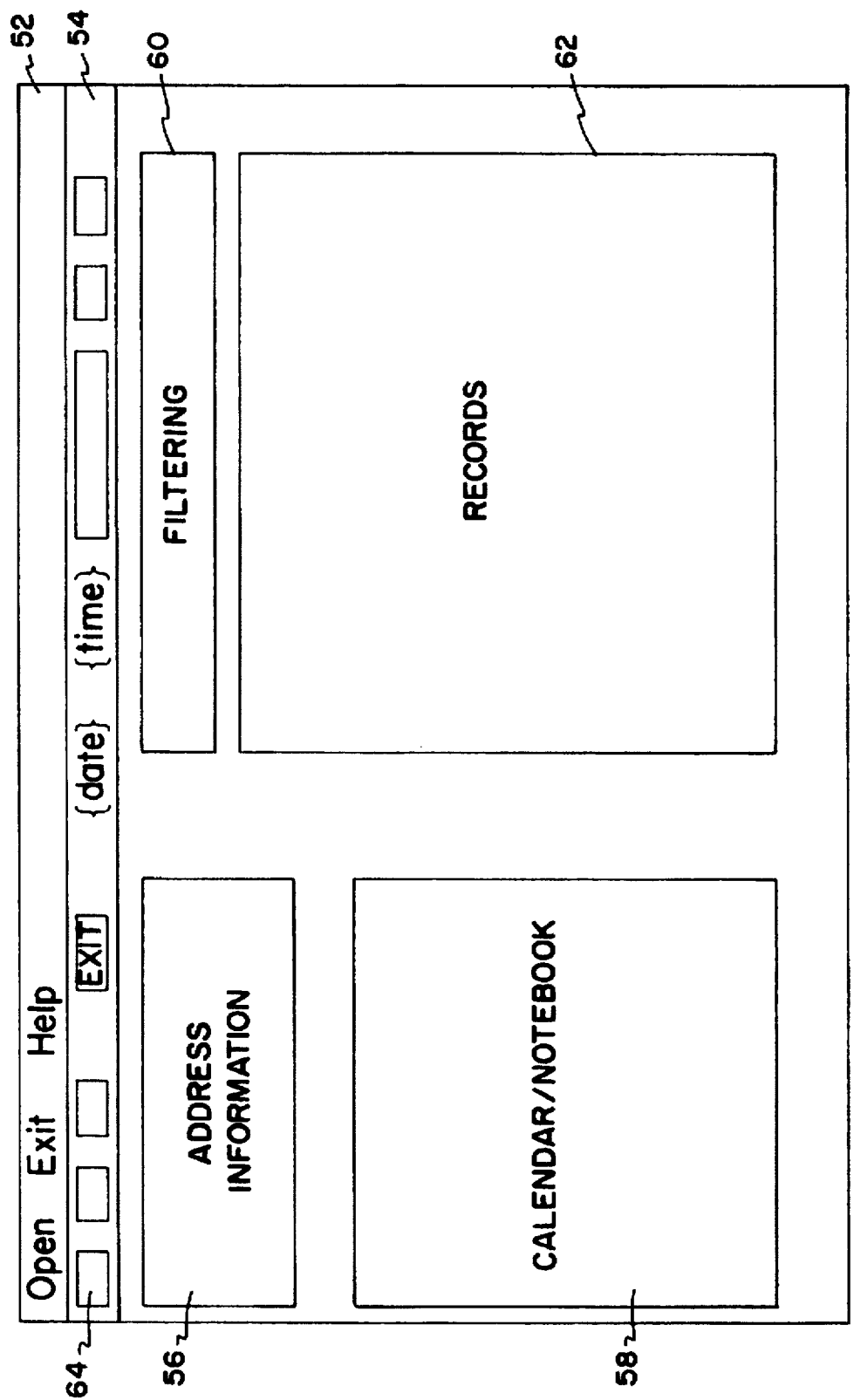
FIG. 4 is a depiction of a user-interface access display of a customizable framework.

FIG. 4 is a depiction of a user-interface access display of the customizable framework. The user interacts with customer contact management system 10 through a user interface. A user interface is something which bridges the gap between a user who seeks to control a device, and the software and/or hardware that actually controls that device. The user interface for a computer is typically a software program running on the computer's central processing unit which responds to certain user-entered commands. Display screens are associated with the user interface to provide the user with visual access to the user interface. FIG. 4 shows the visual access screen for a customizable framework. Program 22 uses object-based windows to provide the visual access for the user interface. Therefore, window 50 provides the visual access for the user interface for the customizable framework. The depiction shown in window 50 is the preferred user interface window, but it should be recognized that other user interface display layouts for the customizable framework could be used without departing from the scope of the present invention.

Window 50 includes a menu bar 52, a tool bar 54, an address information field 56, a calendar/notebook field 58, a filtering field 60 and a records field 62. The menu bar 52 across the top of window 50 includes a set of standard menu options represented by various terms. The tool bar 54 includes certain information, such as date and time, as well as selectable function icons to perform predetermined functions upon selection of the corresponding icon. The address information field 56 is used to display customer address information. Newly acquired address information relating to a customer may be added by accessing a function icon 64 which will provide a nested window (not shown) in which the new address information may be entered. The records field 62 is used to display documents and contact information corresponding to business events. The filtering field 60 provides access to contact types which are defined within the customizable framework, to locate records within those contact types. The filtering field 60 also provides a method of entering filter criteria to filter out records within certain contact types by way of progressive iterations, thereby reducing the total available records to those associated with a desired one or more contact types. The filtering criteria are typically based on the type of user-customer relationship, and more particularly to the contact types, which are definable. Therefore the filtering criteria is also definable according to the preferences of the company utilizing the customer contact management system 10. The calendar/notebook field 58 displays all contacts, based on the current filter criteria, for a particular customer. This field can display contact dates and contact types, or alternatively can display business events related to the customer.

Figure 5:
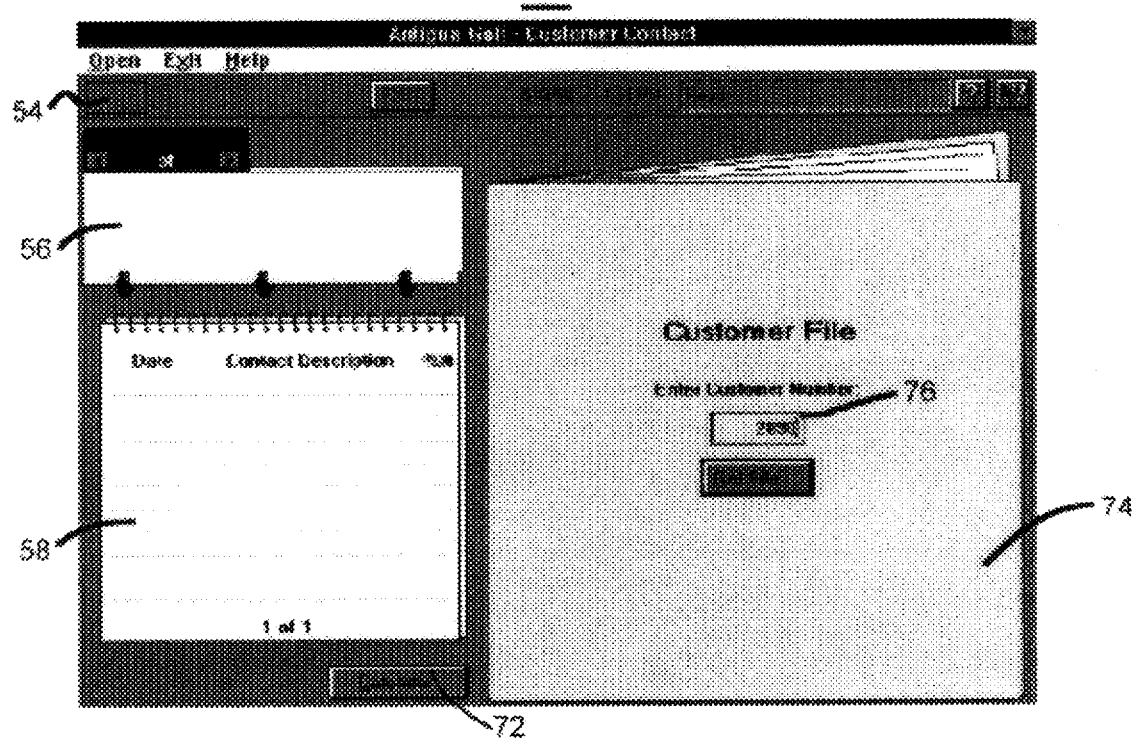
FIG. 5 is a diagram of a user interface window, referred to as the contact desktop window, for access to the customizable framework.

FIG. 5 is a diagram of a preferred user interface window, referred to as the contact desktop window 70, for access to the customizable framework as in step 32 of FIG. 3. The contact desktop window 70 shows more detail of the visual representations selected in the preferred embodiment. The address information field 56 is depicted as a computerized depiction of a card file, providing the ability to electronically "thumb through" the customer list database. The calendar/notebook field 58 is shown in notebook mode, which provides the user with a list of business events. When in calendar mode, the calendar/notebook field 58 displays a calendar upon which various contacts, and their corresponding date of occurrence and contact type, can be displayed. The calendar and notebook only display those contacts which satisfy the current filter criteria. The calendar/notebook toggle selector 72 is used to switch between notebook mode and calendar mode. When in calendar mode, the label "notebook" would appear in place of the label "calendar," which allows switching from calendar mode to notebook mode.

The customer file 74 of FIG. 5 is a computerized depiction of a folder representing an account file which contains detailed information about all contacts relating to that customer or group of customers. Entering a customer number into data capture field 76 designates a particular custom framework relating to that customer. The customer may also be identified by entering the customer's name by way of a name capture icon on the tool bar 54, or through Automatic Number Identification/Dialed Number Identification (ANI/DNI) technology. In the preferred embodiment, ANI/DNI technology is used to automatically activate the custom framework associated with the company that has an association with a customer who has initiated a telephone contact with the user. When the custom framework has been specified, the customer file 74 is replaced by the records field 62 and filtering field 60 as shown in FIG. 4.

Figure 6:
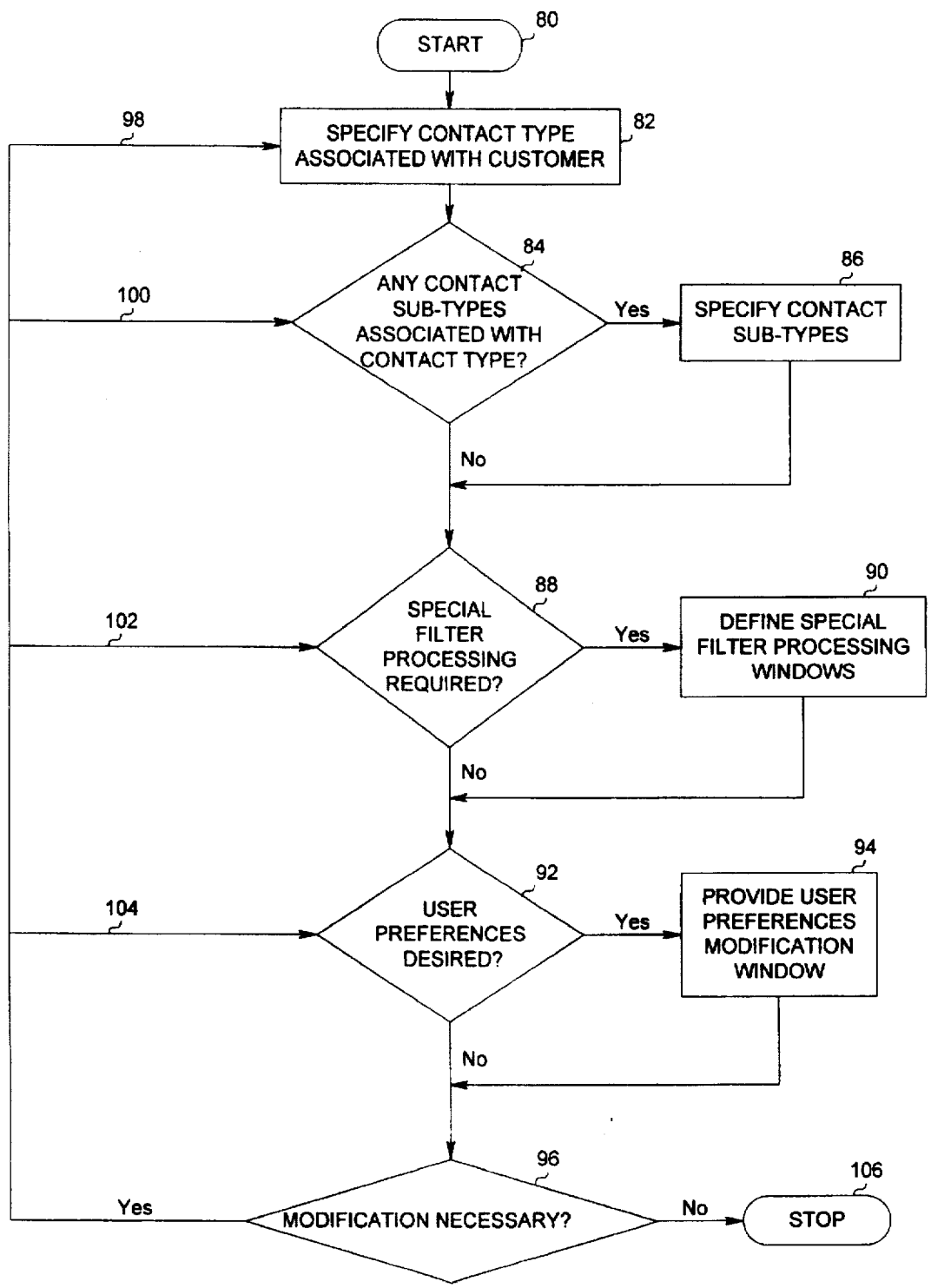
FIG. 6 is a flow diagram of the step of defining a custom framework.

FIG. 6 is a flow diagram of the step of defining a custom framework. In FIG. 3, a custom framework is defined in step 34. FIG. 6 provides the basic flow of this framework definition. The process begins at start step 80. At step 82, the contact types associated with a particular customer or group of customers are determined. This involves the selection of the contact types that have occurred, or are anticipated to occur in the future. The contact types are used as the user's primary filter criteria to filter out records within certain contact types, thereby reducing the total available records to those associated with a desired one or more contact types. Representative examples of user-customer contact types where a company provides a telemarketing or catalog ordering service might include: orders, mail correspondence, correspondence by fax, specific order number, telephone contacts, electronic data interchange (EDI) communications, shipments, product returns, customer inquiries, etc. Again, the contact types may be defined to be as broad or narrow as desired, and the contact types would preferably correspond to the types of product, information, or services provided by the company.

Once one or more contact types have been defined for a customer, the company using the customer contact management system 10 may specify whether contact sub-types are to correspond to each contact type. The decision to include contact sub-types with a particular contact type is performed at step 84. If such contact sub-types are desired, contact sub-types are designated at step 86. Following this designation, or where no contact sub-types are required for a particular contact type, custom framework definition continues at step 88.

Contact sub-types provide secondary levels of filtering criteria through progressive selection iterations of existing contact types or new contact sub-types. A contact sub-type may represent new filter criteria which would only be associated with a particular contact type, or may represent an existing contact type. For instance, two of the total number of contact types could be defined as orders and telephone communications, but telephone communications could also be defined as a contact sub-type of the orders contact type. This allows progressive filtering to locate business events which include only orders made via telephone. Alternatively, new contact sub-types associated with a particular contact type may be associated with that contact type. For example, a shipment contact type may include contact sub-types such as shipment by rail, shipment by air, shipment by mail, etc. This flexibility in the definition of contact types and contact sub-types provides for a powerful and user-friendly customer service tool.

Additional special filter processing may also be defined. Whether such filter processing is required is determined at step 88, and if so, is defined at step 90. Such special filter processing allows a desired business event within a contact type or sub-type to be located by numeric or alphanumeric search criteria. Use of the special filter processing will be described more fully in the description related to FIG. 13.

The framework definition continues at decision step 92, where the user determines whether user preferences are to be defined. Where such preferences are desired, a user preferences window allows the user to input the preferences at step 94. User preferences may be modified at any time by the user. The user preferences window allows the user to customize his or her customized framework to change contact type and sub-type display arrangements, default calendar or notebook mode for the calendar/notebook field 58, and other display options. The user preferences window will be described in more detail in conjunction with the description of FIG. 9.

Decision step 96 of FIG. 6 shows that modification is allowed to change the selected contact types, contact sub-types, special filters and user preferences as shown by flow return lines 98, 100, 102 and 104 respectively. If no further modifications are necessary, definition of the custom framework step ends at stop step 106.

Figure 7:
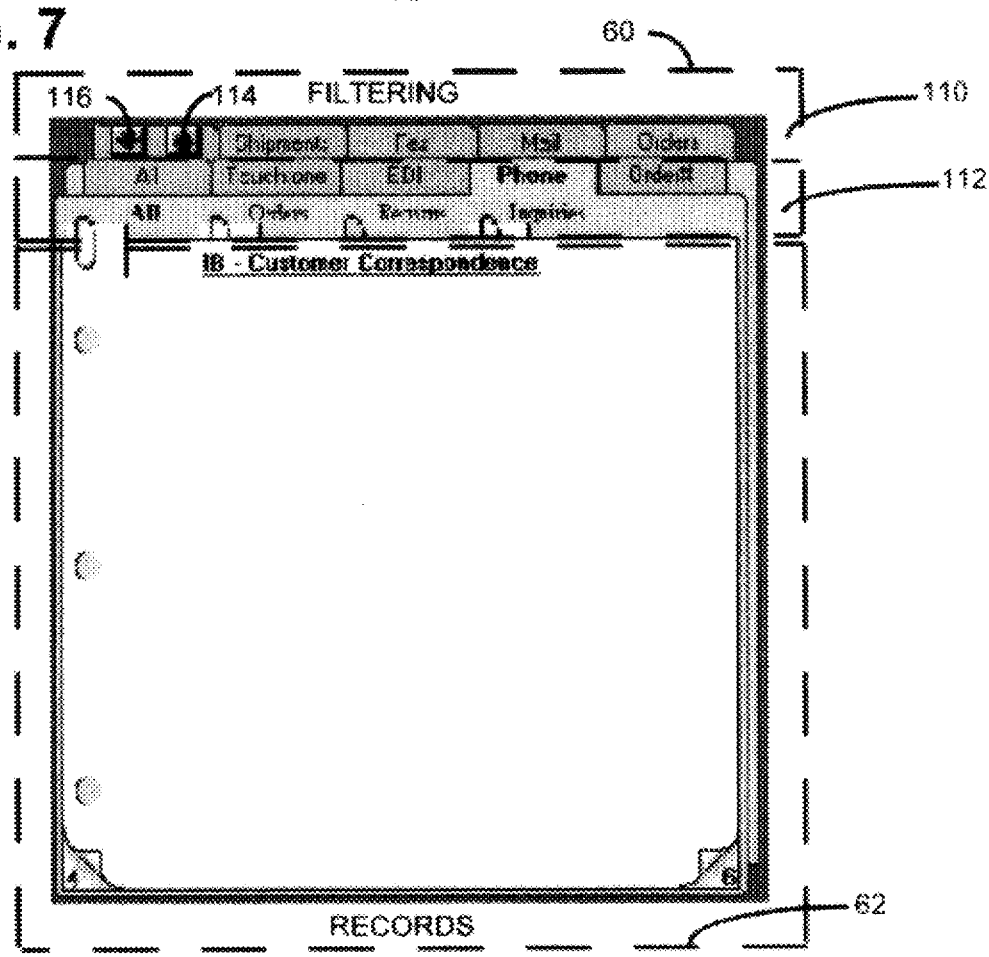
FIG. 7 is a diagram of a display layout for providing access to contact types and sub-types within a filtering field of the custom framework.

FIG. 7 is a diagram of a preferred display layout for providing access to the contact types and sub-types within the filtering field 60 of the custom framework, which is provided for within step 36 of FIG. 3. The filtering field 60 is preferably, but not required to be, placed adjacent to the records field 62. The filtering field 60 includes a primary filtering criteria block 110, and a secondary filtering criteria block 112. The primary filtering criteria block 110 includes a number of selection tabs corresponding to contact types defined by the custom framework. These selection tabs allow the user to select a contact type to filter out business events which are not associated with that contact type, or in other words, to reduce the total number of available business events to those within the selected contact type. For purposes of illustration, examples of contact types and their associated selection tabs are shown in the primary filtering criteria block 110. These contact types include Shipments, Fax, Mail, Orders, All (contact types), Touchtone, EDI, Phone, and Order# (order number). Also within the primary filtering criteria block 110 are the up and down arrows 114 and 116. Actuating the up arrow 114 will bring additional selection tabs into view in the primary filtering criteria block 110 in place of one or more of the existing selection tabs. Actuating the down arrow 116 will scroll back to the previous selection tab display. These arrows allow as many selection tabs (and therefore contact types) to be defined as desired, without having to display all of them at one time.

Contact types may be defined to include one or more contact sub-types. These sub-types are shown in the secondary filtering criteria block 112. Examples of contact sub-types are shown in FIG. 7 as the All, Orders, Returns, and Inquiries sub-types which are related to the selected Phone contact type. A contact sub-type may represent new filter criteria which would only be associated with a particular contact type, or may represent an existing contact type. For example, the All and Orders sub-types are also shown as selection tabs relating to contact types in the primary filtering criteria block 110, but are defined to be contact sub-types of the contact type labeled Phone. Other contact sub-types can be defined to only be associated with the Phone contact type, and would not also be included as contact types having selection tabs in the primary filtering criteria block 110.

The preferred access media for accessing the contact types and sub-types is an electronic desktop file folder displaying file tabs which resembles a physical file with file tabs. The file tabs, generically referred to as selection tabs above, provide the user with a recognizable and user-friendly electronic file. The file and file tabs can be seen in the filtering field 60. The contact sub-types are depicted as paper clips which bind the records associated with the selected contact type (file tab) and contact sub-type. It should be recognized that the depiction of FIG. 7 may be modified without altering the scope of the invention, and therefore should not to be taken in a limiting sense.

Figure 8:
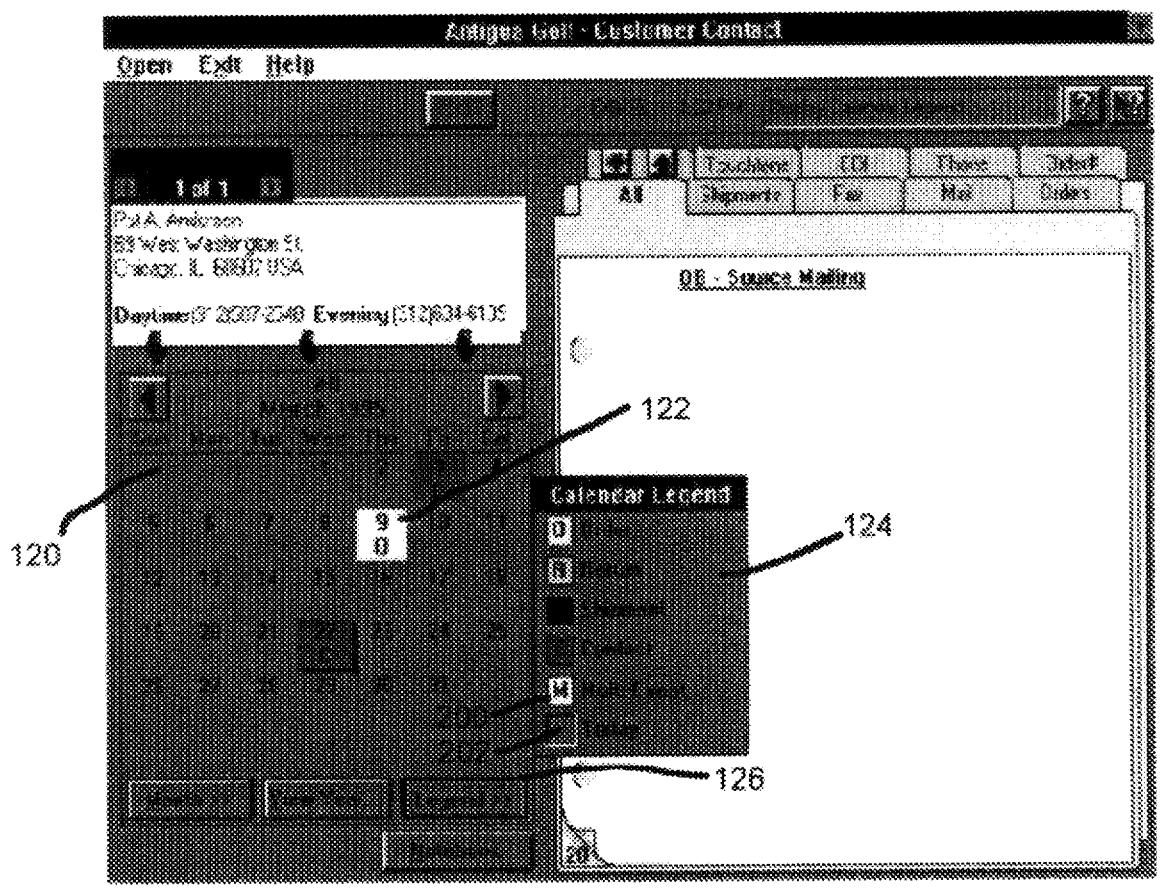
FIG. 8 is a diagram of a display layout for providing access to the contact types within a calendar/notebook field of the customer framework.

FIG. 8 is a diagram of a preferred display layout for providing access to the contact types within the calendar/notebook field 58 of the customer framework, which is provided for within step 36 of FIG. 3. When in calendar mode, the occurrence of one or more business events on a particular date is displayed on the calendar 120 by a visual attribute superimposed over the calendar date. Different visual attributes can represent different contact types so that selection of a date having a certain visual attribute will correspond to business events of a certain contact type. The visual attributes used in the preferred embodiment of the present invention include various-colored rectangles (color not shown) superimposed on the calendar dates. One such visual attribute is shown as attribute 122, which is superimposed over a calendar date.

The contact types which can be displayed in the calendar/notebook field 58 when in calendar mode are listed in the calendar legend 124. Calendar legend 124 is accessed by activating the Legend selector 126. The calendar legend is defined during definition of the custom framework, and can be redefined as desired. The operation of the calendar legend 124 is described more fully in the description of FIG. 14.

Figure 9:
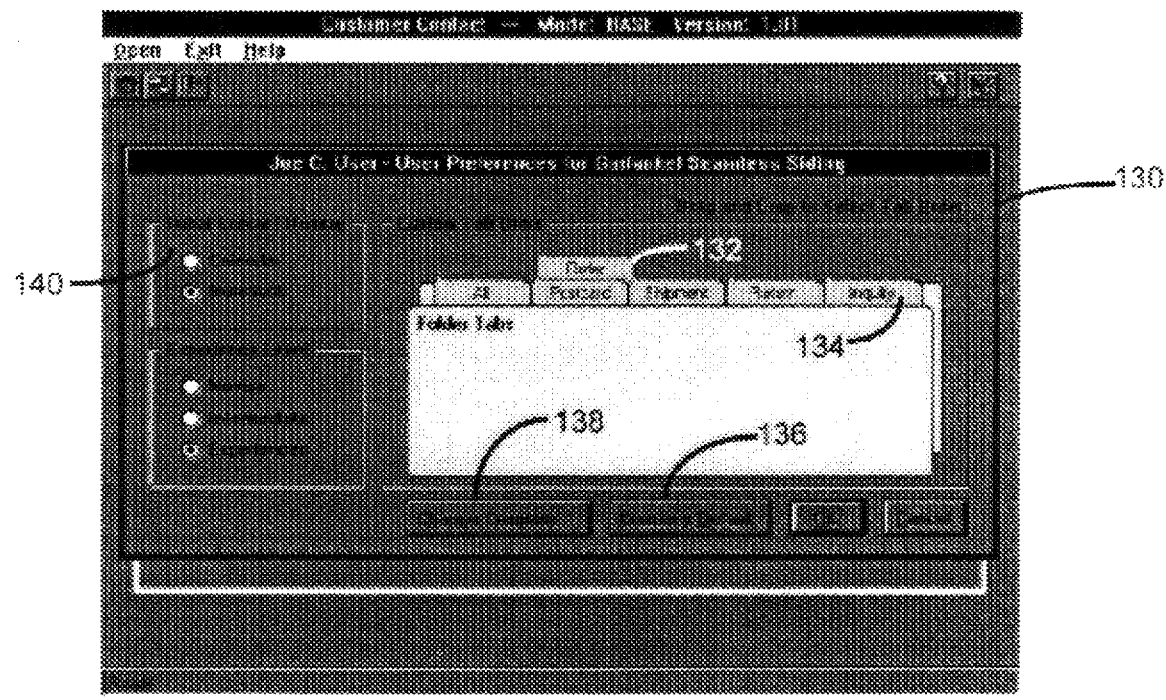
FIG. 9 is a depiction of a user preferences window, which allows the user to customize his or her working environment.

FIG. 9 is a depiction of a user preferences window 130, which allows the user to customize his or her working environment. The user may drag and drop defined contact type file tabs to form a custom file tab arrangement. This allows the user to move file tabs that are used more often to a more readily accessible location atop the desktop file folder in the filtering field 60. For instance, the location of the file tab labeled Order 132 could be switched with the location of the file tab labeled Inquiry 134. The file tabs in the filtering field 60 would then be in the arrangement defined through the use of the user preferences window 130. The user may always revert back to a designated default file tab order via the company default selector 136. Furthermore, the user may at any time switch to a different custom framework via the change company selector 138. The word "company" is used since it is often the case that the user is providing service for more than one company which together comprise the total number of customers. Therefore, each company serviced by the user may have different custom frameworks and different file tab defaults. The user preferences window 130 is opened through the menu bar 52 or the tool bar 54 shown in FIG. 4, and which is preferably a part of each custom framework. Thus, the user preferences window 130 allows display modification of the access to the contact types step 36 of FIG. 3.

The user preferences window 130 also allows the user to select a default display mode for the calendar/notebook field 58 by selecting either the calendar or the notebook in the initial contact display field 140. Either the calendar or the notebook will be initially displayed, depending on the selection made. The user preferences window 130 also provides for input of the experience level of the user. This will dictate which scripting messages and internal messages the user will receive during use of the customer contact management system 10. Internal messages and scripting messages provide assistance to the user upon the occurrence of a predetermined event, and will be described in more detail in the description relating to FIGS. 20 and 21.

Figure 10:
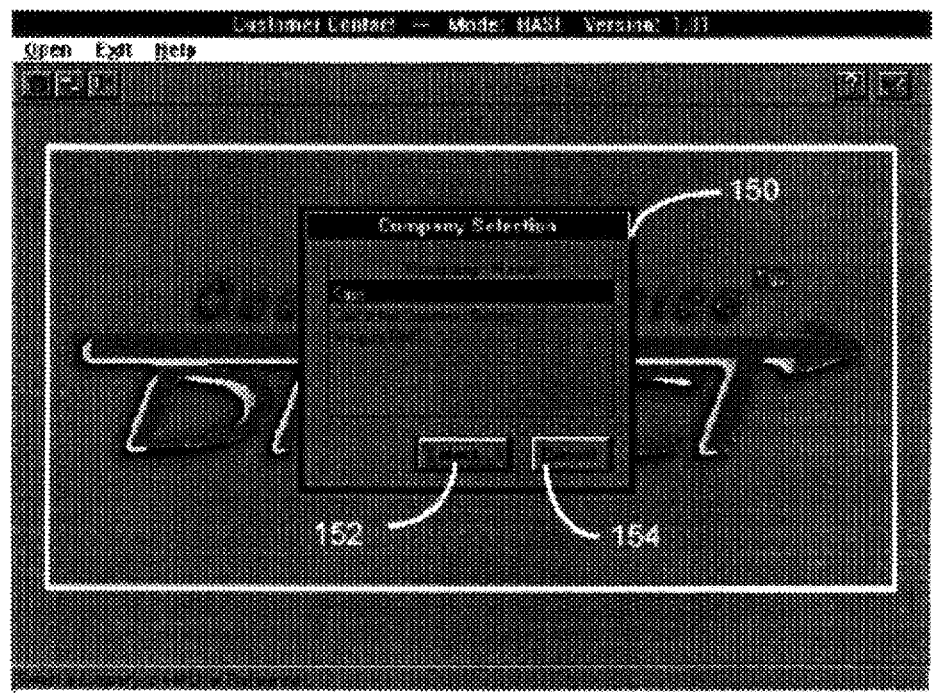
FIG. 10 illustrates a company selection window, which allows the user to select one company for which to edit the user preferences in the user preferences window.

FIG. 10 illustrates a company selection window 150, which allows the user to select one company for which to edit the user preferences in the user preferences window 130. A user may be providing customer service for multiple companies, and a contact may be associated with only one of those companies. In that case, the corresponding company may be selected via the company selection window 150. This window may be accessed in more than one way, including activating the change company selector 138 in the user preferences window 130 of FIG. 9, which allows the user to modify the user preferences for that company. The window is also accessed upon entering the user preferences window 130 where the system includes more than one company, so that modification of the user preferences will take place only with respect to the chosen company. Therefore, contacts relating to a particular company will result in a change of user preferences to match those user preferences defined for that company.

Selection of a company is performed on the company selection window 150 in one of two ways. The preferred method of performing the selection is by using a computer-driven mouse, clicking the mouse button once on the desired company, and then clicking the mouse button on the Select 152 button. A company may also be selected by "double-clicking" on the desired company. Computer-driven mouse operation and the process of double-clicking a mouse is well known in the art, and will not be further described herein. The Cancel selector 154 simply closes the company selection window 150, taking the user back to the previous window without selecting a company.

Figures 11, 12:
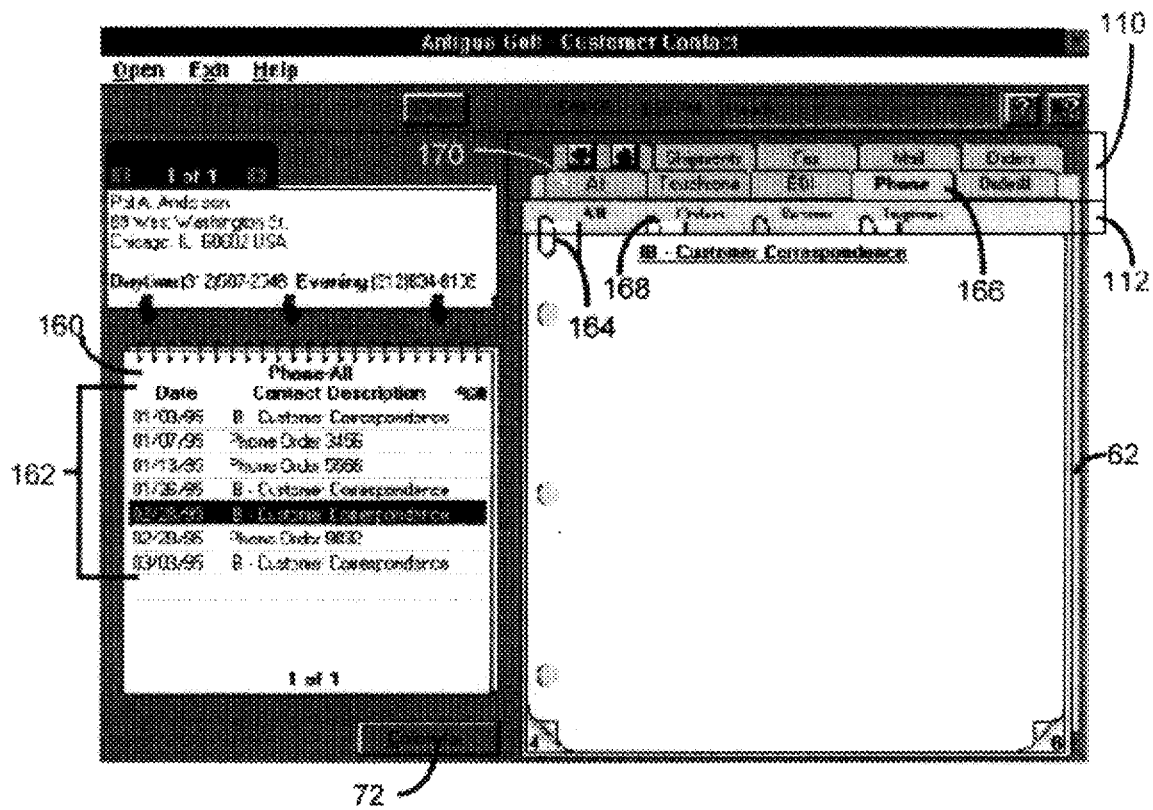
FIG. 11 illustrates a method of locating one or more business events by selecting desired contact types and contact sub-types within the filtering field.
FIG. 12 is a depiction of a notebook displayed in the calendar/notebook field when in notebook mode.

Operation of the invention's filtering function can be described in accordance with FIG. 11. As previously described, the file tabs in the primary filtering criteria block 110 represent the contact types defined within the custom framework. Selection of a file tab acts as a filter in narrowing the total number of business events to only those which are of the contact type selected. Business events are categorized into one or more of the contact types so that they can later be located through filtering. When the calendar/notebook field 58 is in notebook mode, as it is in FIG. 11, the notebook 160 displays the business events 162 which are left remaining following selection of a file tab in the primary filtering criteria block 110. The business events 162 listed on the notebook therefore correspond to the business events which are of the contact type selected via the file tab. Any one of the business events 162 listed on the notebook 160 can then be selected for display in the records field 62.

The calendar/notebook toggle selector 72, previously described in FIG. 5, allows the user to toggle between calendar and notebook mode. When in calendar mode, the calendar/notebook toggle selector 72 reads "Notebook" to enter notebook mode, and when in notebook mode, the calendar/notebook toggle selector 72 reads "Calendar" to enter calendar mode. The calendar displays the occurrence of one or more contacts on a particular day according to the filter criteria used in the filtering field 60 (FIG. 7). The calendar will be described more fully in the description of FIG. 14.

An additional level of filtering is provided through contact sub-types, represented by the electronically depicted paper clips, one of which is shown as the "All" paper clip 164. Any of these paper clips can be selected, which will further reduce the number of business events listed on the notebook or the calendar. The preferred display shows the presently selected paper clip 164 at the left end of the paper clips in the secondary filtering criteria block 112. Each time a new sub-type is desired, a paper clip is selected which immediately switches places with the paper clip currently at the left end of the secondary filtering criteria block 112. Similarly, where a file tab is selected from the "back row" of the filtering field (shown as the shipments, fax, mail and orders file tabs), the front and back rows switch places so as to enable display of the paper clips associated with the selected file tab.

Filtering is essentially the Boolean "AND" function of the contact types and the contact sub-types. Selection of file tab Phone 166 and paper clip Orders 168 results in a notebook display of "phone order" contacts with the designated customer. The business events listed on the notebook 160 must therefore be both a telephone contact AND an order. The number and type of business events listed on the notebook 160 dynamically change according to the file tab (contact type) and paper clip (contact sub-type) selected for a particular customer. When in calendar mode (not shown), the number and type of business events displayed on the calendar also dynamically change according to the file tab and paper clip selected.

One preferred file tab is shown as the "All" file tab 170. This file tab essentially removes the contact type filtering so as to list all business events relating to the designated customer within a custom framework on the notebook 160. A similar function is provided for contact sub-types, shown as the All paper clip 164. This will list all business events on the notebook 160 which relate to the selected file tab, regardless of the existence of contact sub-types. Again, the notebook 160 list of contact events dynamically changes each time a filtering change occurs.

FIG. 12 is a depiction of a notebook 160 displayed in the calendar/notebook field 58 when in notebook mode. Under the contact description column 172, the business event list 162 displays all contacts within the scope of the filter criteria defined by the contact types and sub-types for a particular customer. The business event list 162 is preferably displayed chronologically, as shown by the date column 174. The notebook filter status field 176 indicates which contact types and sub-types have been selected via the file tabs and paper clips.

The notebook 160 is used by the user to display the history of the user-customer contacts. It also provides a method in which a business event may be selected for displaying detailed information, i.e. the associated "record", of the business event. It consists of one or more pages that may be paged through by activating the notebook page-back 178 or notebook page-forward 180 icons at the bottom left and bottom right respectively of the notebook 160. Selecting a business event or paging through the notebook 160 is preferably performed through the use of a computer pointing device such as a mouse. When the user selects a particular business event, it is highlighted as business event 182 indicates. Upon selection of a business event, a record of the business event is displayed in the records field 62 (see FIG. 4).

Figure 13:
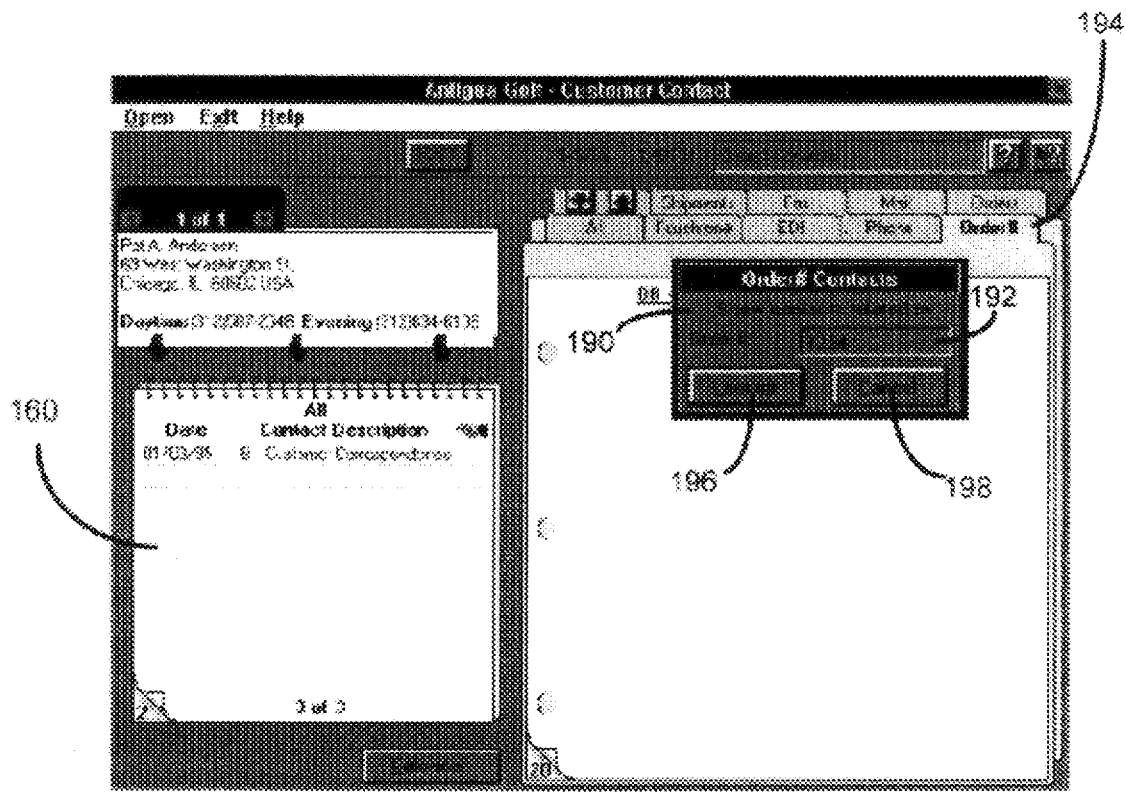
FIG. 13 illustrates the use of a special filter processing window which allows business events to be located by numeric and alphanumeric character search criteria.

FIG. 13 illustrates the use of a special filter processing window 190. Special filter processing allows a desired business event within a contact type or sub-type to be located by numeric or alphanumeric search criteria. The special filter processing window 190 opens upon selection of a file tab defined to utilize special filter processing. Numeric or alphanumeric search criteria can then be entered into the special filter processing data capture field 192. For example, for the file tab labeled Order# 194, the user could enter a specific order number on which to filter. All contacts related to this order number would then be listed on the notebook 160, or on the calendar when in calendar mode. The user can enter a new contact description and refilter the contact list by activating the Lookup selector 196. The Cancel selector 198 closes the special filter processing window 190. If there are no contacts with the entered description, a message appears alerting the user to that effect.

Figure 14:
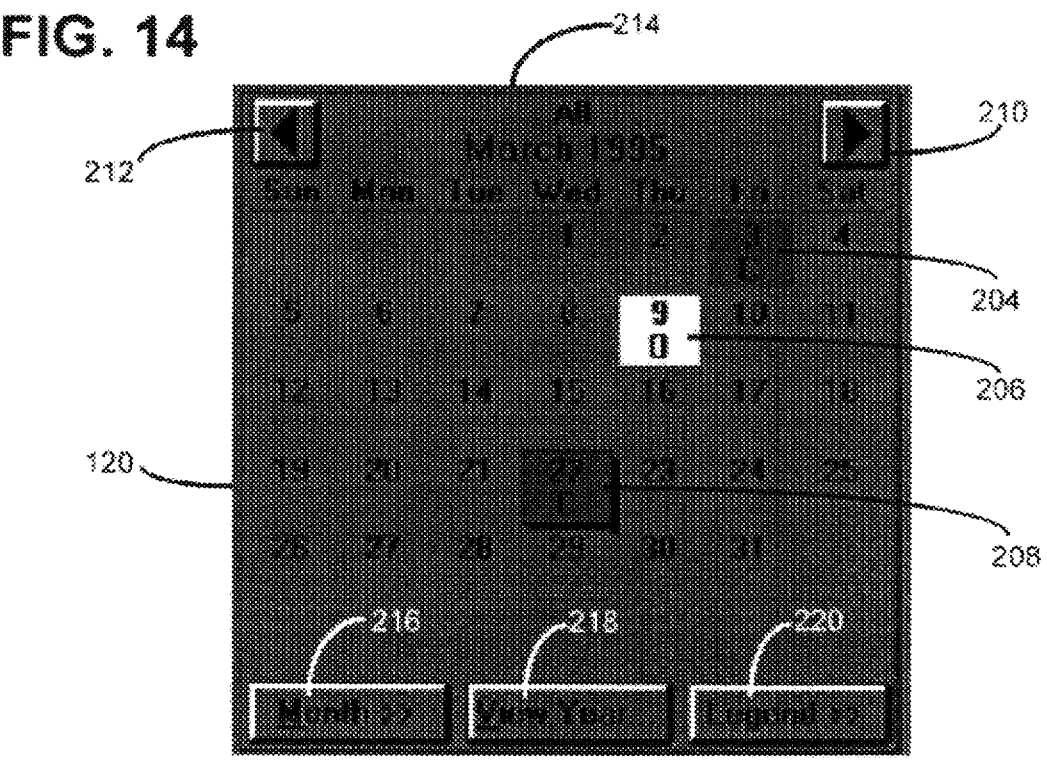
FIG. 14 is a depiction of a calendar displayed in the calendar/notebook field when in calendar mode.

FIG. 14 is a depiction of a calendar 120 displayed in the calendar/notebook field 58 when in calendar mode. Contacts occurring on a specific date are shown on the calendar 120 by superimposing a visual attribute over the calendar date. Different visual attributes can represent different contact types so that selection of a date having a certain visual attribute will correspond to business events of a certain contact type. A cross reference of the contact types to the visual attributes available is shown on the calendar legend 124 shown in FIG. 8. Referring briefly to FIG. 8, the calendar legend 124 displays information to help the user decipher the contacts which are displayed on the calendar 120, and is definable to correspond to a particular customer, group of customers, or other entity having a customer base. In addition to the visual attribute cross reference, the calendar legend 124 has two default entries, labeled Multi-Event 200 and Today 202. Multi-Event 200 is used when more than one contact occurs on a given day. Today 202 highlights the current date.

Returning to FIG. 14, the calendar 120 displays all contacts, based on the current filter criteria, for a particular customer or group of customers. The depiction of contacts 204, 206 and 208 on the calendar correspond to business events which are of the contact type selected via the file tabs in the filtering field 60. Any one of the business events represented by contacts 204, 206 and 208 shown on the calendar 120 can be selected for display in the records field 62.

The calendar month-forward arrow 210 allows the user to scroll forward by month, and the calendar month-backward arrow 212 allows scrolling through previous months. The calendar filter status field 214 indicates which contact types and sub-types have been selected via the file tabs and paper clips. The letter under calendar dates in which a contact occurred represents the contact type itself. For instance, the "O" under the calendar date "9" represents an "Order" contact type, which can also be seen on the calendar legend 124 of FIG. 8.

The calendar 120 also includes option selectors, including the Month selector 216, the View Year selector 218, and the Legend selector 220. The calendar legend 124 of FIG. 8 is accessed by activating the Legend selector 220. The Month selector 216 opens a window (not shown) listing the previous 12 months, in which the user can select a particular month to view. The View Year selector 218 shows the entire calendar year.

Figure 15:
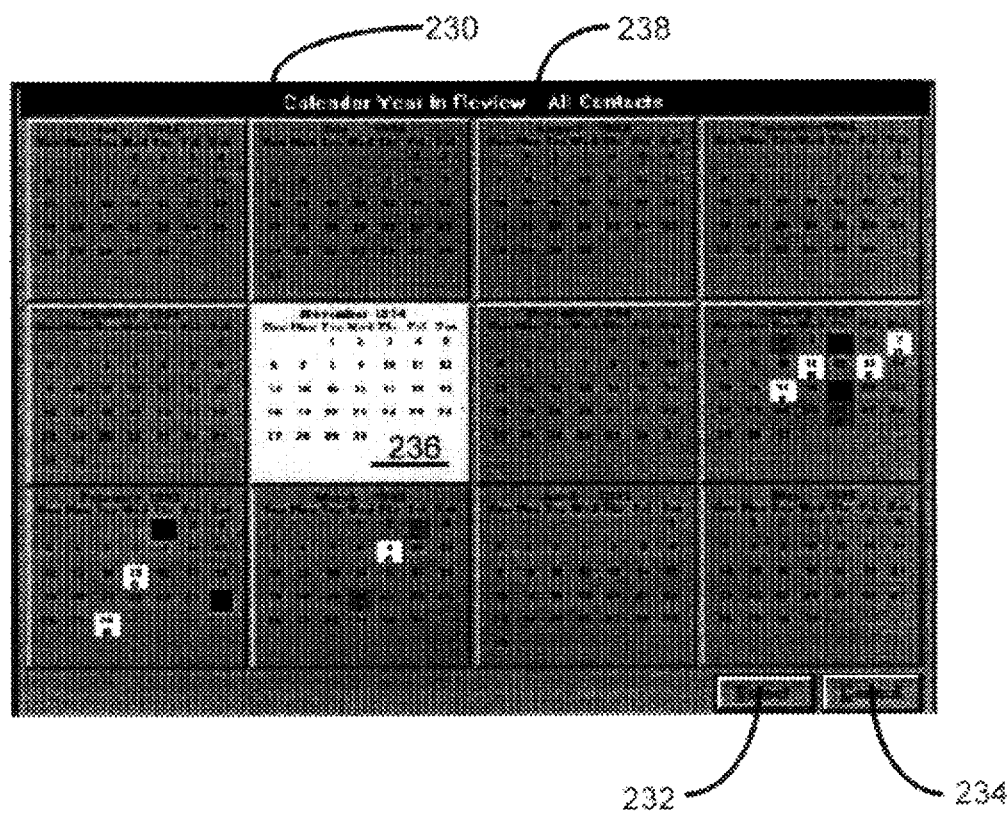
FIG. 15 is a depiction of a calendar year-in-review window which shows an entire calendar year when a view year selector is selected.

FIG. 15 is a depiction of a calendar year-in-review window 230 which shows the entire calendar year when the View Year selector 218 is selected. When the calendar year-in-review window 230 is opened, all contacts from the past 12 months (including the current month) which satisfy the current filter criteria are displayed. The user can select a month to view from the year-in-review calendar by selecting a month and subsequently activating the selector labeled Select 232. The preferred method of performing the selection is by using a computer-driven mouse, clicking the mouse button once on the desired month, and then clicking the mouse button on the Select 232 button. A month may also be selected by "double-clicking" on the desired month. The Cancel selector 234 simply closes the calendar year-in-review window 230, making no changes to the calendar itself.

The contacts displayed on the calendar year-in-review window 230 are those that satisfy the current filter criteria, which is defined by the selections in the filtering field 60. A selected month is highlighted as shown by month 236. The calendar year-in-review filter status field 238 indicates which contact types and sub-types have been selected via the file tabs and paper clips. Contacts are displayed using the same visual attributes as when a single month is displayed, as defined by the calender legend 124.

Figure 16:
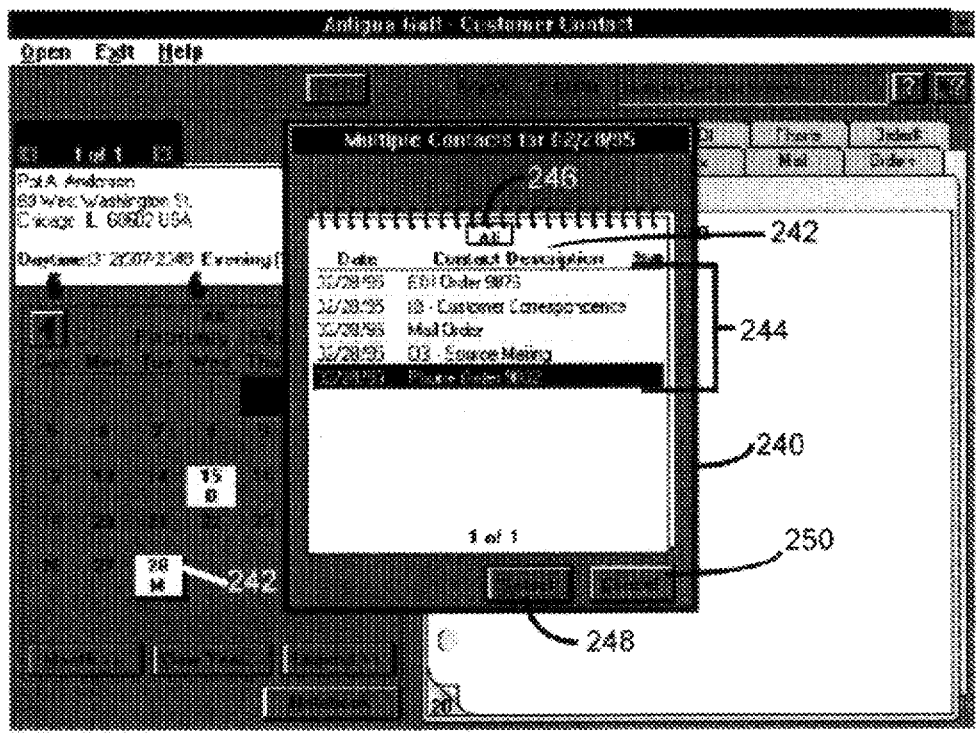
FIG. 16 is a depiction of a multiple contacts window, which is activated upon selection of a calendar date having multiple contact events.

FIG. 16 is a depiction of a multiple contacts window 240. This window is activated upon selection of a calendar date having multiple contact events. Where multiple contacts relating to a particular customer or group of customers occurs on a particular day, the visual attribute depicted on that calendar date corresponds to the Multi-Event 200 contact type shown on the calendar legend 124 of FIG. 8. The multi-event visual attribute shown in FIG. 16 is attribute 242, where the "M" under the calendar date represents that multiple contacts occurred on that day. Other visual attributes, such as color, may also be used to designate multiple contacts.

When the multi-event calendar date is selected, the multiple contacts window 240 lists all of the contacts between a company and a customer on the multi-event calendar date. The display is similar to the notebook representation in the calendar/notebook field 58. Under the contact description column 242, the business event list 244 displays all contacts within the scope of the current filter criteria defined by the contact types and sub-types for a particular customer on that calendar date. The multiple contacts filter status field 246 indicates which contact types and sub-types have been selected via the file tabs and paper clips. The multiple contacts window 240 also provides a method in which a business event may be selected for displaying detailed information, i.e. the associated "record" in the records field 62, of the business event. The user can select a business event and associated record for viewing by clicking on a business event and subsequently activating the selector labeled Select 248. A business event may also be selected by double-clicking on the desired business event. Once a business event has been selected, the corresponding record of the contact will be displayed in the records field 62. The Cancel selector 250 simply closes the multiple contacts window 240 without selecting a business event or displaying a corresponding record in the records field 62.

Figure 17B:
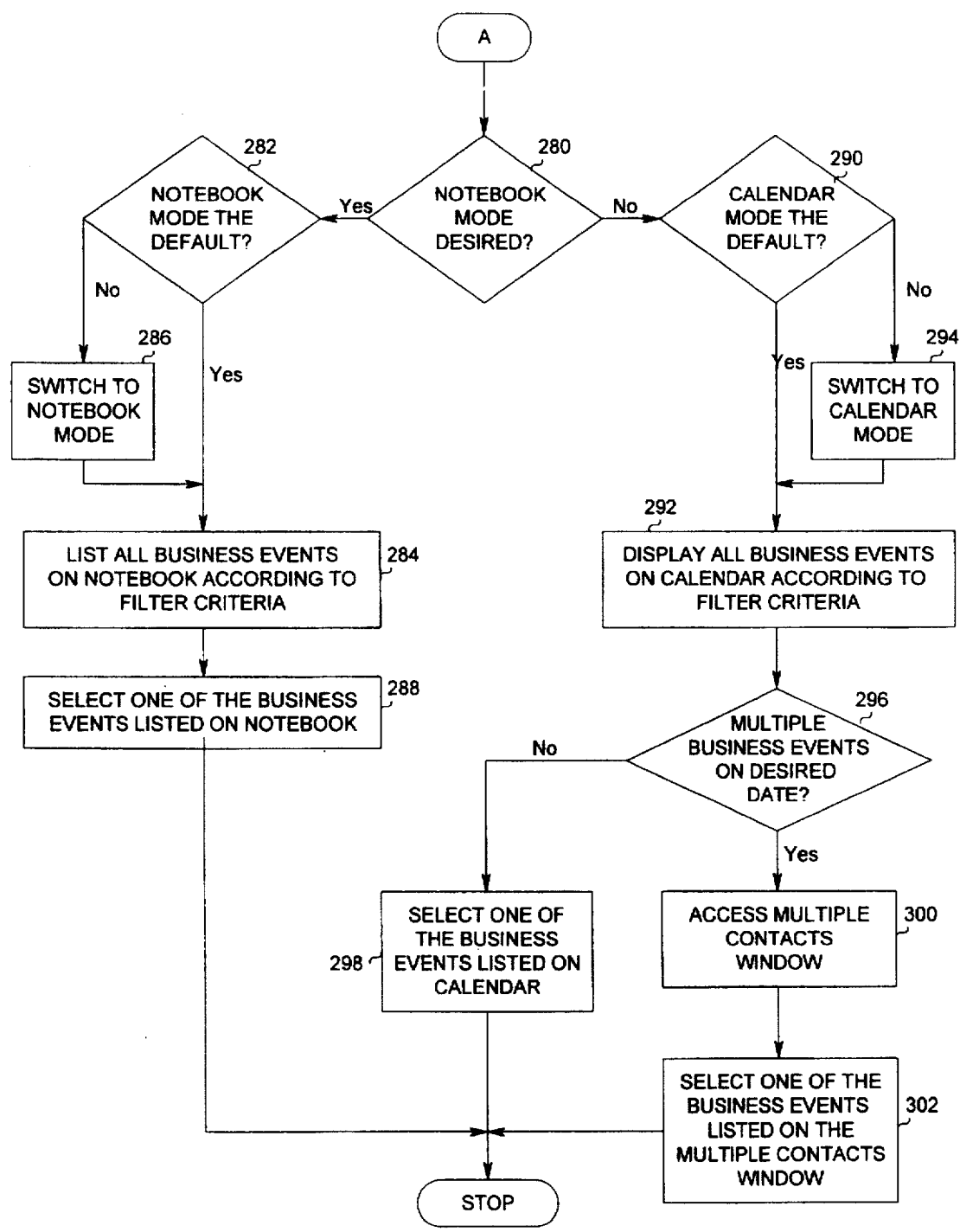
FIG. 17 comprises FIGS. 17A and 17B, which together comprise a flow diagram of the step of searching for business events.

FIGS. 17A and 17B together comprise a flow diagram of the step 40 of searching for business events. This diagram generally summarizes the filtering and searching of contacts and contact types described above. In FIG. 3, searching for business events relating to particular customers within the custom framework is shown in step 40. FIGS. 17A and 17B provide the basic flow of this searching process.

The process begins at start step 260, and continues to decision step 262 where it is determined whether contact type filtering is desired. Contact type filtering is preferably accomplished by selecting a file tab in the filtering field 60 (FIG. 4) corresponding to a particular contact type. If it is desired that all contacts be displayed, i.e., no filtering is desired, the "All" file tab is selected at step 264, and the process continues along path 266. If filtering of contact types is desired, a file tab is selected at step 268. This will reduce the total number of available business events to those within the selected contact type. When a contact type has been selected, the contact sub-types which are related to the selected contact type (if any) are displayed preferably by way of paper clip representations at step 270. Then, the user may elect to further filter the business events through contact sub-type filtering at decision step 272. If it is desired that all contact sub-types be displayed, i.e., no sub-type filtering is desired, the "All" paper clip is selected at step 274, and the process continues along path 276. If filtering of contact sub-types is desired, a contact sub-type selection tab (i.e., paper clip representation of contact sub-type) is selected at step 278. This will further reduce the total number of available business events to those within the selected contact type and contact sub-type.

At any time within this filtering process, selection of a desired business event can take place. This is depicted by providing steps 264, 274 and 278 with access to decision step 280 of FIG. 17B which provides a starting point in selecting a business event. Decision step 280 shows that the user has the option of locating a business event by way of the calendar or the notebook. If the notebook mode is desired at decision step 280, the process continues to step 282, where it is determined whether the default mode is the notebook mode rather than the calendar mode. Briefly referring to FIG. 9, the user preferences window 130 allows the user to select a default display mode for the calendar/notebook field 58 by selecting either the calendar or the notebook in the initial contact display field 140. If the default mode has been selected to be the notebook mode, the process proceeds to step 284. If the default mode has been selected to be the calendar mode, the user may switch to notebook mode at step 286, and again the process proceeds to step 284. Step 284 entails listing all of the business events on the notebook according to the filter criteria selected by way of steps 262, 264, 268, 270, 272, 274 and 278. From these listed business events, one may be selected as shown at step 288.

Similarly, if the calendar mode is desired, the process flows from decision step 280 to step 290, wherein the default mode is again ascertained. If the calendar mode has been selected as the default, the process proceeds from step 290 to step 292. If the default mode has been selected to be the notebook mode, the user may switch to calendar mode at step 294, and continue at step 292. The business events according to the current filter criteria are displayed at step 292. Step 296 indicates that the possibility exists for more than one business event to have occurred on a given date. Where there are no multiple contacts on the desired date, the desired business event can be selected directly from the calendar as shown at step 298. Where there are multiple contacts on the desired date, the multiple contacts window 240 (FIG. 16) can be accessed as shown at step 300, and the process proceeds at step 302, wherein one of the business events listed on the multiple contacts window 240 may be selected.

Returning again to FIG. 3, it can be seen at step 38 that notifications of the occurrence of business events are generated and stored by the user which may be later searched at search step 40. User-generated business events are often those including such information as advertisement or catalog mailings (or other product/service/information source mailings), user-initiated correspondence, surveys, inquiry responses, billings, shipments, or any other user-initiated business event. A notification that these user-generated business events have occurred are generated by the user. The user can also generate business event notifications when the customer initiates the contact, and the user enters information regarding that contact. An example would be where a customer telephones the user, and the user generates a notification of a business event (and possibly a corresponding record) relating to the telephone conversation. A business event notification could be generated by the user upon any customer-initiated business event, whether the contact is made by telephone, fax, EDI, letter, in-person contact, or any other customer-initiated contact. These notifications of the occurrence of business events include the time, date, and contact type, and provide the means for subsequent business event searches.

In the preferred embodiment of the invention, notifications that business events have occurred are generated automatically upon the occurrence of a user-initiated contact. For instance, where the user generates a letter to be sent to a customer, a business event has occurred, and a notification indicating the time, date, and contact type would be automatically stored in the system. The occurrence of customer-initiated business events may also be automatically generated and stored. The time and date of the contact can be automatically recorded as the occurrence of a business event when a customer or group of customers is recognized by the customer contact management system 10. A contact type can then be supplemented by the user.

The occurrence of a business event may also involve the generation and storage of a corresponding record of the content of the business event. This is shown at step 42 of FIG. 3. Records may be generated by the user after or during the course of a contact. For example, where a customer makes a contact with the user, the user may indicate that one or more business events has occurred, and may generate records detailing the nature of those business events. Records may also be generated by scanning documents rather than creating the record through user input.

Figure 18:
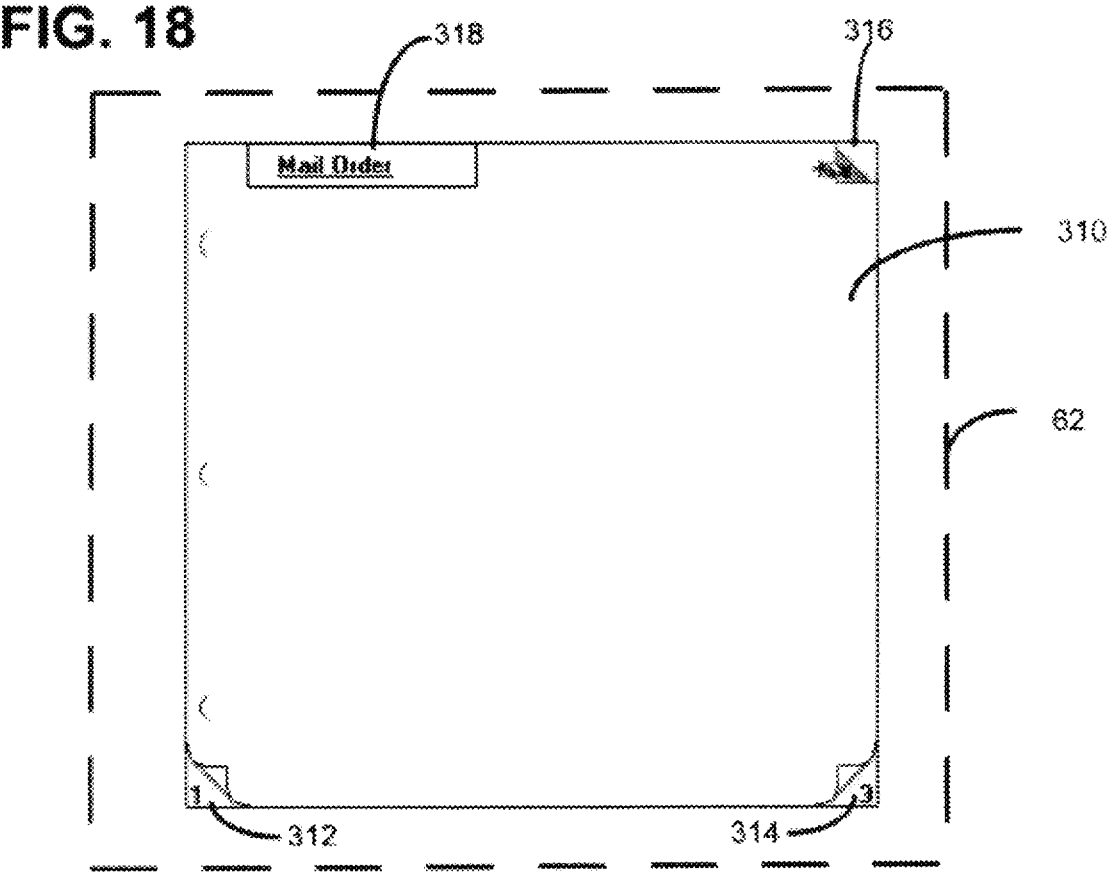
FIG. 18 illustrates an embodiment of a record window in the record field.

FIG. 18 illustrates an embodiment of a record window 310 in the record field 62. All records satisfying the current filter criteria are available in the records field. The user may scroll through the records of the business events in the record field 62 by selecting the records page-backward icon 312 or the records page-forward icon 314. This essentially "turns the page" of the electronic records file. The user may also mark a record by selecting the reminder icon 316. The records filter status field 318 indicates which contact types and sub-types have been selected via the file tabs and paper clips.

Figure 19:
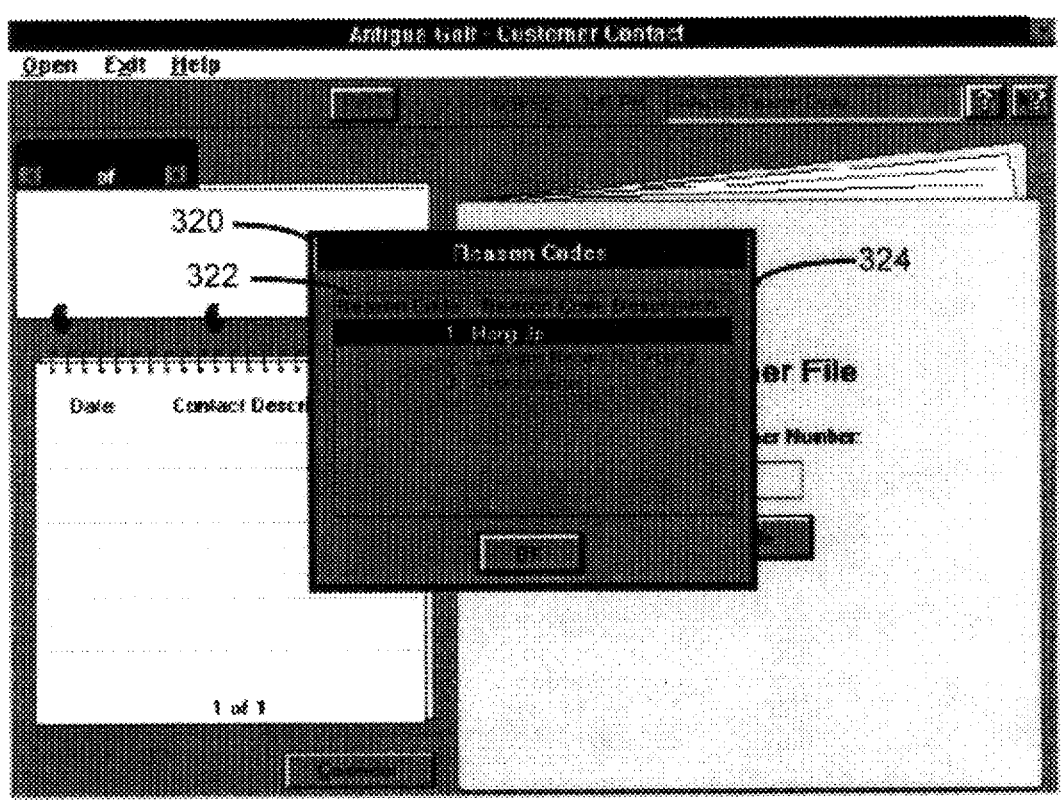
FIG. 19 shows a reason codes window, which provides a list of company-specific codes and descriptions of the reasons a call was exited.

FIG. 19 shows a reason codes window 320, which provides a list of company-specific codes and descriptions of the reasons a call was exited. The reason codes are used to record statistics as to the reason preselected contacts (e.g., telephone contacts) were terminated prior to inputting a business event for the customer. In the preferred system, the user must select a reason code when such a contact has been terminated. The reason code field 322 provides a numeric or alphanumeric code which corresponds to a description in the reason code description field 324. The "OK" selector 326 closes the reason codes window 320 after a reason code has been selected.

Figure 20:
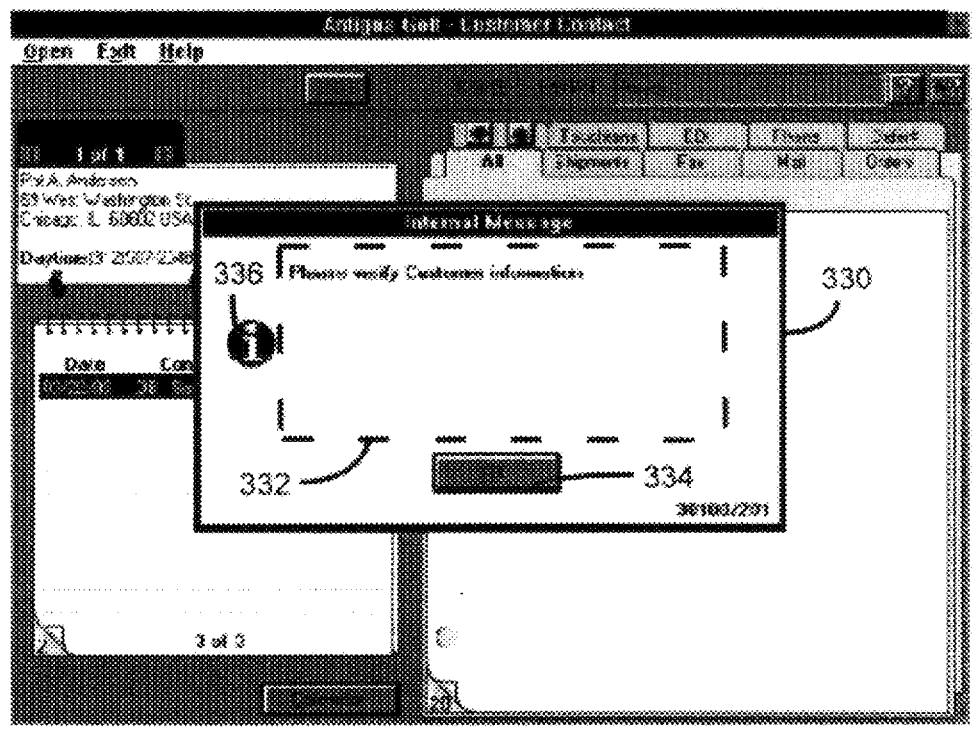
FIG. 20 illustrates an internal message window, which is used to display internal messages to the user.

FIG. 20 illustrates an internal message window 330. This window is used to display internal messages to the user which are intended to assist the user in the customer service process, and are not intended to be provided to the customer. The content of the messages and when the messages are to be provided is defined for each company. Furthermore, different messages may be displayed depending upon the experience level of the user, which is defined via the user preferences window 130 of FIG. 9. Therefore, a message which may only be appropriate for an inexperienced user will not appear for an experienced user. The message is displayed in the message field 332. In addition, multiple selectors 334 can appear on the internal message window 330. The number of selectors 334 appearing on this window will change depending upon the possible responses the user has with regard to the message. Also, different icons 336 will appear in the window depending upon the type of message which is displayed.

Figure 21:
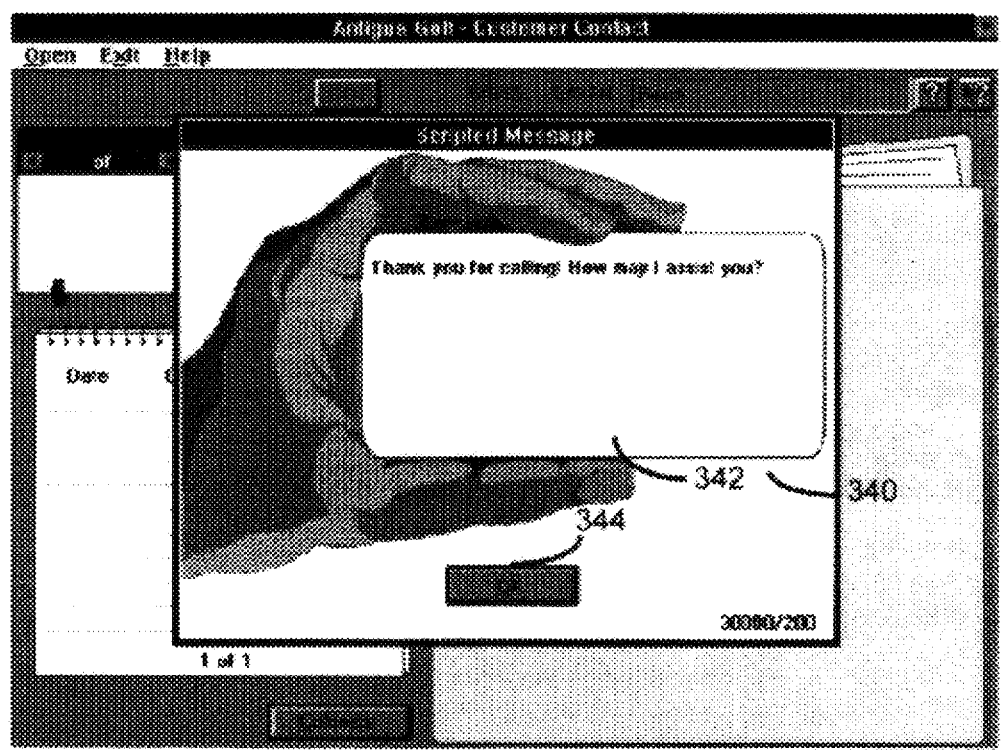
FIG. 21 illustrates a method of providing scripted messages to the user, which involves providing predefined messages to the user to assist the user during the customer service contact.

FIG. 21 illustrates a preferred method of providing scripted messages to the user. A scripted message window 340 provides predefined messages to the user to assist the user in the customer service process. The scripted message provided in the scripted message field 342 is intended to be contemporaneously read to the customer by the user during a contact. The content of the scripted messages and when the scripted messages are to be provided is defined for each company. Different messages may be displayed depending upon the experience level of the user, which is defined by way of the user preferences window 130. This allows inexperienced users to obtain a higher degree of assistance than what would be required for an experienced user. The number of selectors 344 appearing on the window will change depending upon the number of possible responses the user may have.

Figure 22:
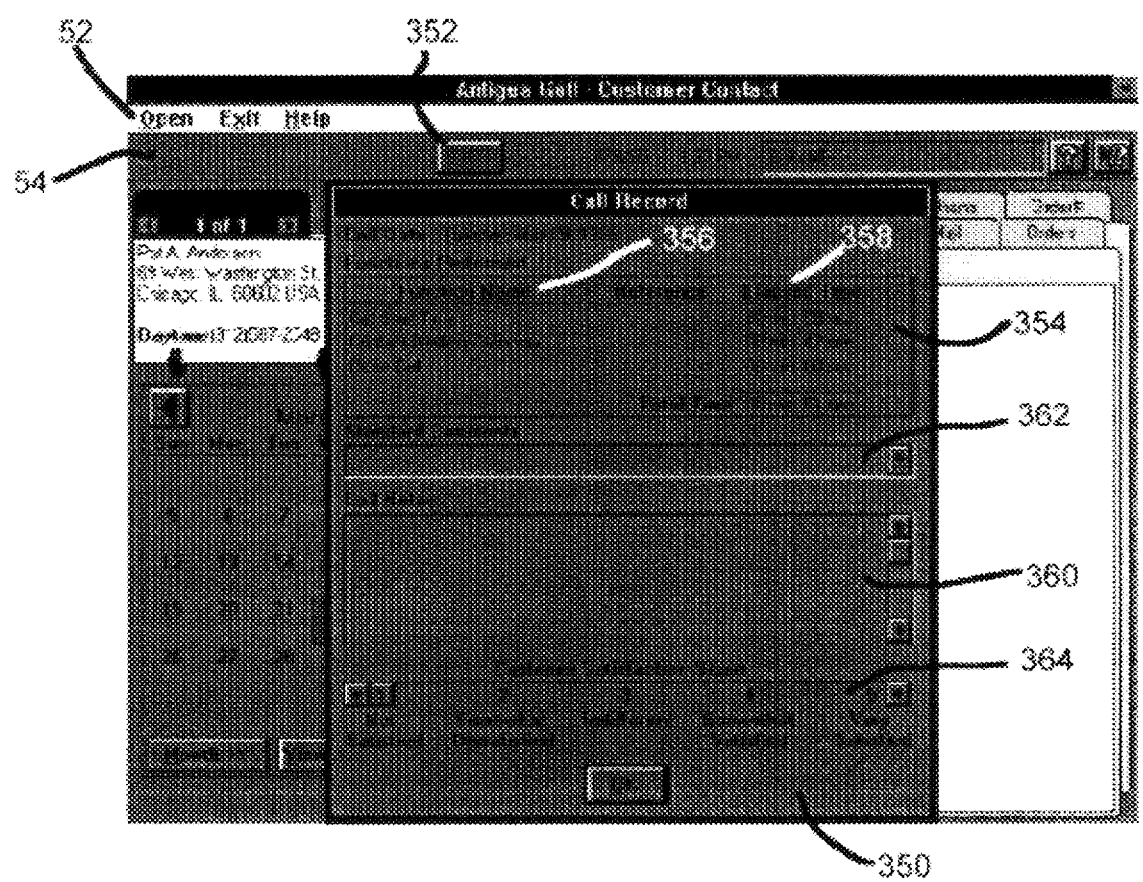
FIG. 22 shows a call record entry window, which allows a user to review the functions performed during a telephone contact.

FIG. 22 shows a call record entry window 350, which allows a user to review the functions performed during a telephone contact. The call record entry window 350 is not limited to telephone contacts, but rather could be used for in-person contacts, electronic discourse, or any other contact wherein the user and customer engage in "real-time" user-customer discourse. The call record entry window 350 is displayed when the user selects the Exit selector 352 on the tool bar 54, or when the user exits the call from the menu bar 52. This window displays all information gathered about the call currently being saved in the function information field 354. Various functions that were performed, shown in the function name field 356, are time stamped, and the elapsed time of the function is displayed in the elapsed time field 358. This allows the user to review the length of time spent for each function. Any notes entered by the user during the call are displayed in the call notes field 360. Additional notes may be entered by the user by typing the notes in the call notes field 360, or by selecting comments from the standard list that is provided in the standard comments field 362. Different standard comments can be defined for different companies, or even for different users and customers. The user can specify his or her impression of the customer's satisfaction level by selecting a satisfaction level from the customer satisfaction scale 364.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A computerized customer service system for assisting a user in providing service to a customer in connection with products, information and services, the customer service system comprising:

a) a computer system for storing, displaying, and processing information; and b) software comprising directive information for configuring the computerized customer service system within the computer system, the software implementing in the computer system the steps of:
 i) storing customer relationship information, including customer identification information and one or more business events related to one or more customers;
 ii) providing a customizable framework for storing, retrieving and displaying the customer relationship information according to one or more contact types related to the one or more customers;
 iii) displaying a depiction of the one or more contact types within the customizable framework associated with the one or more customers;
 iv) locating a business event within the customizable framework associated with the one or more customers, by selectively processing any one or more of the customer identification information, a contact date, and one or more of the contact types; and
 v) selectively displaying one or more records detailing the business event located by the locating step.

2. The customer service system of claim 1, further comprising the step of contemporaneously generating a new business event during the occurrence of user-generated, system-generated, and customer-generated contacts.

3. The customer service system of claim 1, further comprising the step of automatically generating a new business event upon the occurrence of predetermined user-generated, system-generated, and customer-generated contacts.

4. The customer service system of claim 3, wherein the step of automatically generating a new business event comprises the step of using Automatic Number Identification/Dialed Number Identification (ANI/DNI) technology to recognize the occurrence of the customer-generated contacts.

5. The customer service system of claim 1, wherein the step of displaying a depiction of the one or more contact types comprises the step of displaying a file folder having a labeled file tab for at least some of the one or more contact types.

6. The customer service system of claim 5, wherein the step of locating a business event comprises the step of selecting one or more of the business events associated with a corresponding one or more of the labeled file tabs.

7. The customer service system of claim 6, wherein the step of locating a business event further comprises the step of providing one or more sub-type file tabs corresponding to one or more contact sub-types, for further narrowing a total number of the business events associated with the corresponding one or more of the labeled file tabs if the business event being searched includes contact sub-types.

8. The customer service system of claim 7, wherein the step of displaying a file folder further comprises the step of depicting the one or more sub-type file tabs as one or more titled paper clips binding the one or more records within the selected contact type and the contact sub-type.

9. The customer service system of claim 1, further comprising the step of specifying and selectively displaying the customer identification information related to the one or more customers.

10. The customer service system of claim 9, wherein the step of specifying and selectively displaying the customer identification information comprises the step of visually depicting the customer identification information in the form of a card file.

11. The customer service system of claim 9, further comprising the step of using Automatic Number Identification/Dialed Number identification (ANI/DNI) technology to automatically display the customer identification information related to customer-initiated telephone and electronic business events.

12. The customer service system of claim 1, wherein the step of displaying a depiction of one or more contact types comprises the steps of:
 a) displaying a calendar; and
 b) displaying, in association with dates on the calendar, one or more unique attributes, each unique attribute corresponding to a particular contact type.

13. The customer service system of claim 12, wherein the step of displaying the one or more unique attributes comprises displaying different colors, each color representing a different attribute.

14. The customer service system of claim 12 wherein the step of displaying the one or more unique attributes comprises the step of superimposing the attributes over at least a portion of corresponding date fields on the calendar.

15. The customer service system of claim 12 wherein the step of displaying a calendar comprises the step of selecting between month-in-review and year-in-review calendars.

16. The customer service system of claim 1, wherein the step of displaying a depiction of one or more contact types comprises the step of selecting between displaying a calendar depicting the one or more contact types and displaying an ordered list of the one or more business events within the one or more contact types.

17. The customer service system of claim 1, wherein the step of displaying a depiction of one or more contact types further comprises the step of displaying an ordered list of the one or more business events.

18. The customer service system of claim 17, wherein the step of displaying an ordered list comprises the step of displaying all of the business events within one or more selected contact types.

19. The customer service system of claim 17, wherein the step of displaying an ordered list comprises the step of displaying the ordered list on a depiction of a notebook.

20. The customer service system of claim 1, further comprising the step of representing the one or more records as virtual paper representations.

21. The customer service system of claim 20, wherein the step of representing the one or more records as virtual paper representations further comprises the step of scanning hardcopy documents corresponding to business events to provide electronic replicas of the hardcopy documents.

22. The customer service system of claim 20, wherein the step of representing the one or more records as virtual paper representations further comprises the step of storing electronic replicas of user-developed documents and system-developed documents corresponding to business events.

23. The customer service system of claim 20, wherein the step of representing the one or more records as virtual paper representations further comprises the step of receiving and storing customer-developed electronic documents corresponding to corresponding ones of the business events.

24. The customer service system of claim 1, wherein the step of providing a customizable framework comprises the step of defining one or more contact types.

25. The customer service system of claim 24, wherein the step of allowing any number of contact types to be defined comprises the step of allowing definition of user-initiated contact types, system-initiated contact types, and customer-initiated contact types.

26. The customer service system of claim 1, wherein the step of displaying a depiction of the one or more contact types comprises the step of modifying the depiction to correspond to the number and depiction labels of the contact types within the customizable framework.

27. The customer service system of claim 1, wherein the step of locating a business event within the customizable framework comprises the step of selecting at least one desired business event from a group of business events generated by designating combinations of contact types.

28. The customer service system of claim 1, wherein the step of locating a business event comprises the step of selecting one or more of the business events from a group of business events associated with a selected one or more of the contact types.

29. The customer service system of claim 28, wherein the step of locating a business event further comprises the step of providing a plurality of contact sub-types for further narrowing the group of business events to provide a second group of business events associated with the selected one or more of the contact types and a selected one or more of the plurality of contact sub-types.

30. The customer service system of claim 29, wherein the step of locating a business event further comprises the step of selecting one or more of the business events from the second group of business events associated with the selected one or more of the contact types and the selected one or more of the plurality of contact sub-types.

31. The customer service system of claim 30, wherein the step of locating a business event further comprises the step of providing a character search input field for inputting numeric and alphanumeric character search strings and for locating the business events that include an inputted character search string.

32. The customer service system of claim 31, wherein the step of providing a character search input field includes the step of locating the business events from the user's choice of the first group of business events, the second group of business events, or all available ones of the business events.

33. The customer service system of claim 29, wherein the step of displaying a depiction of one or more contact types comprises the step of selecting between displaying a calendar depicting the selected one or more contact types and sub-types, and displaying an ordered list of the one or more business events within the selected one or more contact types and selected ones of the plurality of contact sub-types.

34. The customer service system of claim 12, wherein the step of displaying one or more unique attributes further comprises the step of providing a calendar legend for cross referencing each unique attribute with its corresponding contact type.

35. The customer service system of claim 1, wherein the system comprises means for selecting all display selections by way of a screen pointing device, thus reducing the probability of the user experiencing carpal tunnel.

36. A computerized customer service system for assisting a user in providing service to a customer in connection with products or services, the customer service system comprising:

a) a computer system for storing, displaying, and processing information; and
  b) software comprising directive information for configuring the computerized customer service system within the computer system, the software implementing in the computer system the steps of:
   i) storing customer relationship information, including customer identification information and business events related to one or more customers;
   ii) providing a customizable framework for storing, retrieving and displaying the customer relationship information according to one or more contact types related to the one or more customers;
   iii) locating a business event within the customizable framework associated with the one or more customers, by selectively processing any one or more of the customer identification information, a contact date, and the one or more contact types;
   iv) selectively displaying one or more records detailing the business event located by the locating step; and
   v) contemporaneously generating a new business event upon the occurrence of predetermined user-generated, system-generated, and customer-generated activities.

37. The customer service system of claim 36, wherein the step of locating a business event comprises the step of progressively filtering out the contact types unrelated to the one or more business events being searched.

38. The customer service system of claim 37, wherein the step of filtering comprises the step of selecting one or more of the contact types associated with the one or more business events being searched.

39. The customer service system of claim 38, wherein the step of filtering further comprises the step of selecting one or more contact sub-types associated with the one or more contact types.

40. The customer service system of claim 39, wherein the step of filtering further comprises the step of providing a character search input field for inputting numeric and alphanumeric character search strings and for locating the business events that include the character search string.

41. The customer service system of claim 40, wherein the step of providing a character search input field includes the step of locating the business events from the user's choice of the selected one or more contact types, the one or more contact sub-types, or all available ones of the business events.

42. The customer service system of claim 37, wherein the step of filtering comprises the steps of:

a) displaying a file folder having a file tab for preselected ones of the contact types;
  b) selecting one of the file tabs related to the one or more business events being searched;
  c) displaying one or more sub-type file tabs corresponding to an equal number of contact sub-types, if the one or more business events being searched includes contact sub-types; and
  d) selecting one of the sub-type file tabs.

43. The customer service system of claim 42, wherein some of the sub-type file tabs may correspond to one or more other contact types rather than to ones of the contact sub-types.

44. The customer service system of claim 42, wherein the step of displaying one or more sub-type file tabs comprises the step of depicting the sub-type file tabs as titled paper clips binding the one or more records within the selected contact type and the contact sub-type.

45. The customer service system of claim 42, further comprising the step of providing a character search input field for inputting a numeric or alphanumeric character search string and for filtering out those of the business events that do not include the character search string.

46. The customer service system of claim 37, further comprising the step of providing an ordered list of the business events from which one of the business events can be selected.

47. The customer service system of claim 46, wherein the step of providing an ordered list comprises the step of listing only those of the business events that are related to the contact types that are not filtered out by the filtering step.

48. The customer service system of claim 46, wherein the step of filtering further comprises the steps of:
   a) selecting one or more of the contact types associated with the one or more business events being searched; and
   b) selecting one or more contact sub-types associated with the one or more contact types.

49. The customer service system of claim 48, wherein the step of providing an ordered list comprises the step of listing only those of the business events that are related to the selected one or more of the contact types and the selected one or more of the contact sub-types.

50. The customer service system of claim 37, further comprising the step of providing a calendar depiction indicating each occurrence of the business events from which one of the business events can be selected.

51. The customer service system of claim 50, wherein the step of providing a calendar depiction comprises the step of depicting only those of the business events that are related to the contact types that are not filtered out by the filtering step.

52. The customer service system of claim 50, wherein the step of filtering further comprises the steps of:
   a) selecting one or more of the contact types associated with the one or more business events being searched; and
   b) selecting one or more contact sub-types associated with the one or more contact types.

53. The customer service system of claim 52, wherein the step of providing a calendar depiction comprises the step of depicting only those of the business events that are related to the selected one or more of the contact types and the selected one or more of the contact sub-types.

54. The customer service system of claim 37, wherein the step of filtering comprises the step of providing a character search input field for inputting a numeric or alphanumeric character search string and for filtering out those of the business events that do not include the character search string.

55. The customer service system of claim 36, wherein the step of contemporaneously generating a new business event further comprises the step of contemporaneously creating a new record associated with the new business event.

56. The customer service system of claim 55, wherein the creating a new record step comprises the step of allowing the user to enter the customer relationship information.

57. The customer service system of claim 55, wherein the creating a new record step comprises the step of scanning hardcopy customer relationship information into the system by way of a scanning device.

58. The customer service system of claim 55, wherein the creating a new record step comprises the step of receiving customer relationship information by way of electronic data communications.

59. The customer service system of claim 36, further comprising the step of displaying a depiction of a file folder having file tabs corresponding to the contact types.

60. The customer service system of claim 59, further comprising the steps of:
   a) providing contact sub-types associated with the contact types;
   b) displaying a depiction of a paper clip for each of the contact sub-types associated with the contact types; and
   c) providing access to the records associated with the contact types and sub-types by selecting respective ones of the depictions of the file tabs and paper clips.

61. The customer service system of claim 36, wherein the step of providing a customizable framework further comprises the step of creating a custom framework for each of one or more groups of customers.

62. The customer service system of claim 36, wherein the step of providing a customizable framework further comprises the step of creating a custom framework for each of one or more business entities providing customer service to their respective customers.

63. The customer service system of claim 36, wherein the step of contemporaneously generating a new business event further comprises the step of automatically providing a contact termination window for recording statistical information regarding the reasons for the termination of a terminated one of the business events.

64. The customer service system of claim 36, further comprising the step of automatically providing internal informational messages to the user upon the occurrence of predetermined events, which assist the user in taking actions regarding the business event.

65. The customer service system of claim 36, further comprising the step of automatically providing scripted messages to the user upon the occurrence of predetermined events, which may be read by the user to the customer.

66. The customer service system of claim 36, wherein the step of contemporaneously generating a new business event further comprises the step of automatically storing statistical information regarding the business event, which may later be reviewed by the user.

67. A computer-readable medium encoded with data representing a computer program means which can cause a computer, having memory and a display device, to perform functions to assist a user in providing service to a customer in connection with products, information, or services, the computer program means comprising:
   a) framework customization program means for causing the computer to modify a customer service application template to create a custom framework according to contact types related to the customer;
   b) contact display program means for causing the computer to display a depiction of the contact types within the custom framework;
   c) search program means for causing the computer to locate business events that are associated with the contact types by processing user-entered filter criteria defined by selection of one or more of the contact types;
   d) record display program means for causing the computer to display a record detailing information corresponding to a located one of the business events; and
   e) business event entry program means for causing the computer to store new business events, and for causing the computer to store new records corresponding to the new business events.

68. The computer-readable medium as in claim 67, wherein the contact display program means of the computer program comprises file folder display program means for causing the computer to display a file folder having a labeled file tab for each of the contact types which can be selected by the user to generate the filter criteria.

69. The computer-readable medium as in claim 68, wherein the framework customization program means of the computer program further comprises contact sub-type program means for causing the computer to further modify the customer service application template to create the custom framework according to contact sub-types of the contact types.

70. The computer-readable medium as in claim 69, wherein the contact display program means of the computer program comprises paper clip display program means for causing the computer to display a representation of a paper clip for each of the contact sub-types which can be selected by the user to further generate the filter criteria.

71. The computer-readable medium as in claim 67, wherein the contact display program means of the computer program comprises notebook display program means for causing the computer to display a notebook having an ordered list of the business events located according to the filter criteria.

72. The computer-readable medium as in claim 67, wherein the contact display program means of the computer program comprises calendar display program means for causing the computer to display a calendar, and for causing the computer to display visual attributes corresponding to respective contact types on calendar dates on which business events have occurred.

73. The computer-readable medium as in claim 72, wherein the calendar display program means of the computer program comprises filter selection program means for causing the computer to display selected ones of the visual attributes based on the filter criteria.

74. A computerized method of assisting a user in providing service to a customer in connection with products, information and services, the method comprising the steps of:
   a) storing customer relationship information, including customer identification information and one or more business events related to one or more customers;
   b) providing a customizable framework for storing, retrieving and displaying the customer relationship information according to one or more contact types related to the one or more customers;
   c) displaying a depiction of the one or more contact types within the customizable framework associated with the one or more customers;
   d) locating a business event within the customizable framework associated with the one or more customers, by selectively processing any one or more of the customer identification information, a contact date, and one or more of the contact types; and
   e) selectively displaying one or more records detailing the business event located by the locating step.

75. The method claim 74, wherein the step of displaying a depiction of the one or more contact types comprises the step of displaying a file folder having a labeled file tab for at least some of the one or more contact types.

76. The method of claim 75, wherein the step of locating a business event comprises the step of selecting one or more of the business events associated with a corresponding one or more of the labeled file tabs.

77. The method of claim 76, wherein the step of locating a business event further comprises the step of providing one or more sub-type file tabs corresponding to one or more contact sub-types, for further narrowing a total number of the business events associated with the corresponding one or more of the labeled file tabs if the business event being searched includes contact sub-types.

78. The method of claim 77, wherein the step of displaying a file folder further comprises the step of depicting the one or more sub-type file tabs as one or more titled paper clips binding the one or more records within the selected contact type and the contact sub-type.

79. The method of claim 74, wherein the step of displaying a depiction of one or more contact types comprises the steps of:
   a) displaying a calendar; and
   b) displaying, in association with dates on the calendar, one or more unique attributes, each unique attribute corresponding to a particular contact type.

80. The method of claim 74, wherein the step of displaying a depiction of one or more contact types comprises the step of selecting between displaying a calendar depicting the one or more contact types and displaying an ordered list of the one or more business events within the one or more contact types.

81. The method of claim 74, wherein the step of displaying a depiction of one or more contact types further comprises the step of displaying an ordered list of the one or more business events.

82. The method of claim 81, wherein the step of displaying an ordered list comprises the step of displaying all of the business events within one or more selected contact types.

83. The method of claim 81, wherein the step of displaying an ordered list comprises the step of displaying the ordered list on a depiction of a notebook.

84. The method of claim 74, further comprising the step of representing the one or more records as virtual paper representations.

85. The method of claim 74, wherein the step of displaying a depiction of the one or more contact types comprises the step of modifying the depiction to correspond to the number and depiction labels of the contact types within the customizable framework.

* * * * *

UNITED STATES PATENT AND TRADEMARK OFFICE
CERTIFICATE OF CORRECTION

PATENT NO. : 5,737,726

DATED : APRIL 7, 1998

INVENTOR(S) : CAMERON ET AL.

It is certified that error appears in the above-identified patent and that said Letters Patent is hereby corrected as shown below:

Column 2, line 29, after "how" insert —to—.

Column 6, line 48, "companies" should read —companies'—.

Column 20, line 1, "identification" should read —Identification—.

Column 21, line 30, "inputted" should read —input—.

Column 25, line 47, after "method" insert —of—.

Signed and Sealed this

Second Day of February, 1999

*Attest:*

*Attesting Officer*

*Acting Commissioner of Patents and Trademarks*